United States Patent [19]
Nakamura et al.

[11] Patent Number: 5,745,296
[45] Date of Patent: Apr. 28, 1998

[54] MULTIBEAM RECORDING DEVICE

[75] Inventors: Tetsuya Nakamura; Koichi Maruyama; Takashi Iizuka, all of Tokyo, Japan

[73] Assignee: Asahi Kogaku Kogyo Kabushiki Kaisha, Tokyo, Japan

[21] Appl. No.: 648,767

[22] Filed: May 16, 1996

[30] Foreign Application Priority Data

| May 17, 1995 | [JP] | Japan | 7-142744 |
| May 17, 1995 | [JP] | Japan | 7-142745 |
| May 17, 1995 | [JP] | Japan | 7-142747 |
| Aug. 14, 1995 | [JP] | Japan | 7-228531 |
| Aug. 14, 1995 | [JP] | Japan | 7-228532 |

[51] Int. Cl.$^6$ .......................................... G02B 27/10
[52] U.S. Cl. .................................. 359/641; 359/618
[58] Field of Search .......................... 359/641, 618; 369/44.37, 112, 121

[56] References Cited

U.S. PATENT DOCUMENTS

| 3,984,845 | 10/1976 | Tashiro et al. | 396/548 |
| 4,854,688 | 8/1989 | Hayford et al. | 359/641 |
| 5,162,949 | 11/1992 | Kubota | 359/719 |
| 5,202,867 | 4/1993 | Matsui et al. | 369/44.23 |
| 5,349,471 | 9/1994 | Morris et al. | 359/565 |
| 5,416,616 | 5/1995 | Jenkins et al. | 359/11 |
| 5,619,488 | 4/1997 | Ota et al. | 369/112 |

FOREIGN PATENT DOCUMENTS

6-186490  7/1994  Japan.

OTHER PUBLICATIONS

"Third Order Abberation in the Optical System, Including Decentering Error" by Yoshiya Matsui, Shadan–Hojin Nihon Opto–Mechatronics Association (Japan Optoelectro–Mechanics Association), Jun. 1990 and an English language translation.

*Primary Examiner*—David C. Nelms
*Assistant Examiner*—Ricky Mack
*Attorney, Agent, or Firm*—Greenblum & Bernstein P.L.C.

[57] ABSTRACT

Lens arrangements for a multibeam recording device include a first lens group that forms collimated beams paired with a second lens group, allowing the second lens group to be moved for focusing. A first lens group forms non-collimated beams is paired with a second lens group, allowing one lens group to be moved for magnification change. A first lens group forms non-collimated beams between internal portions and collimated beams leading to a second lens group, allowing magnification change by moving the two portions and focus change by moving the second lens group. A first lens group having two movable portions is paired with a second lens group, both movable portions being shiftable and tiltable to correct for decentering errors. Three concrete reduction lens system examples applicable in each of the embodiments use positive anomalous dispersion glass, allowing low dispersion and the use of blue LEDs to increase the imaging resolution.

37 Claims, 35 Drawing Sheets

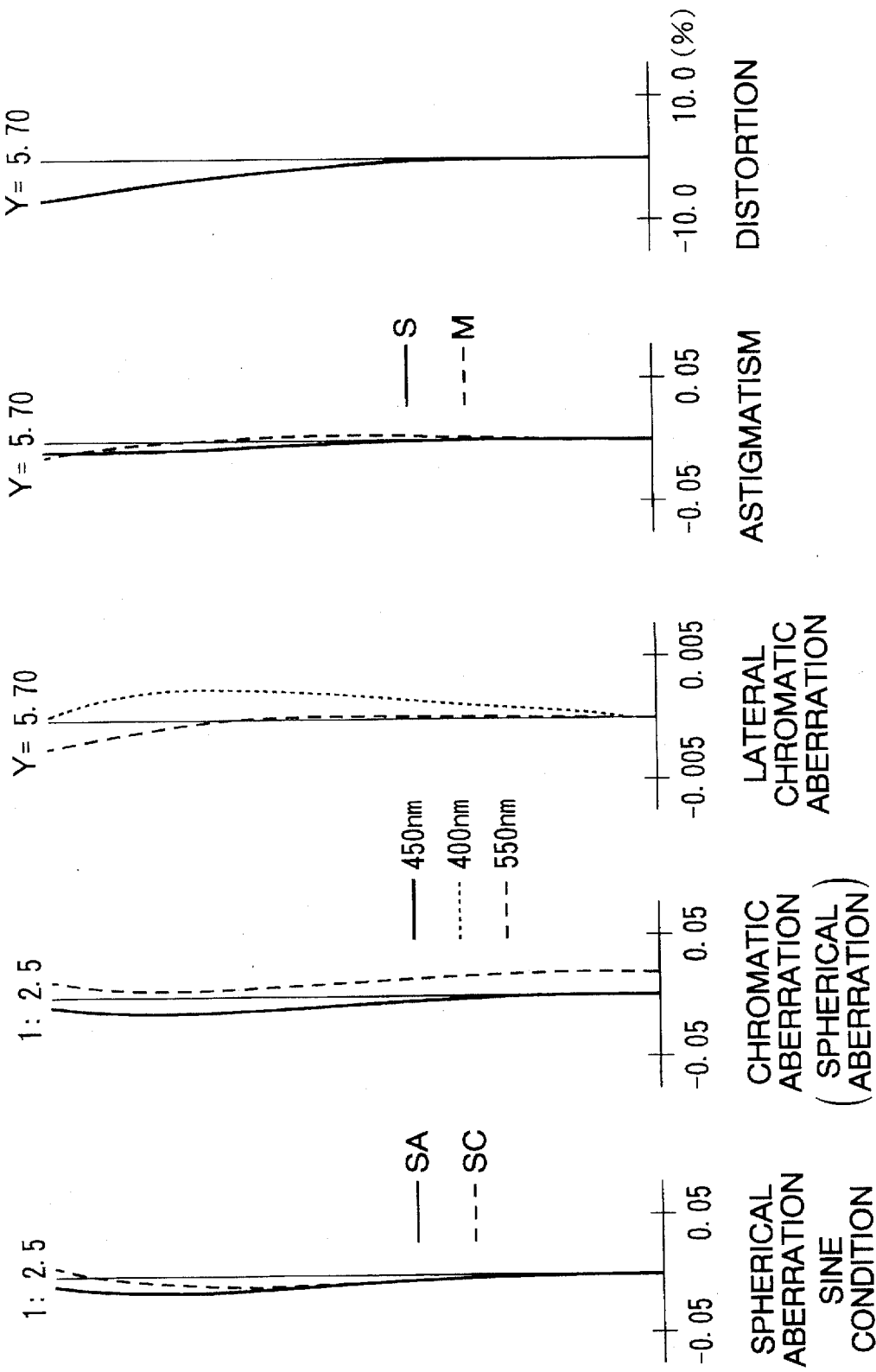

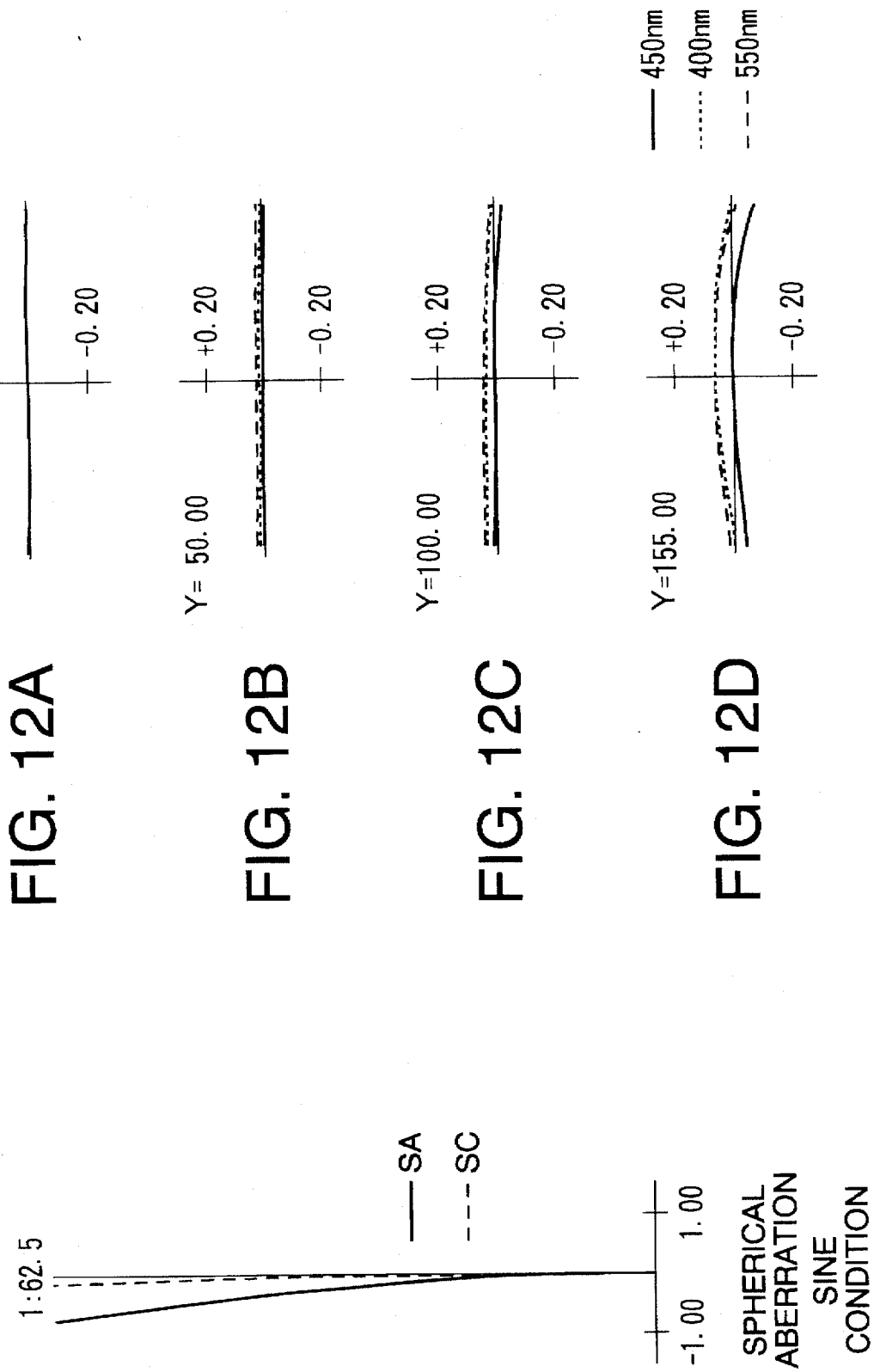

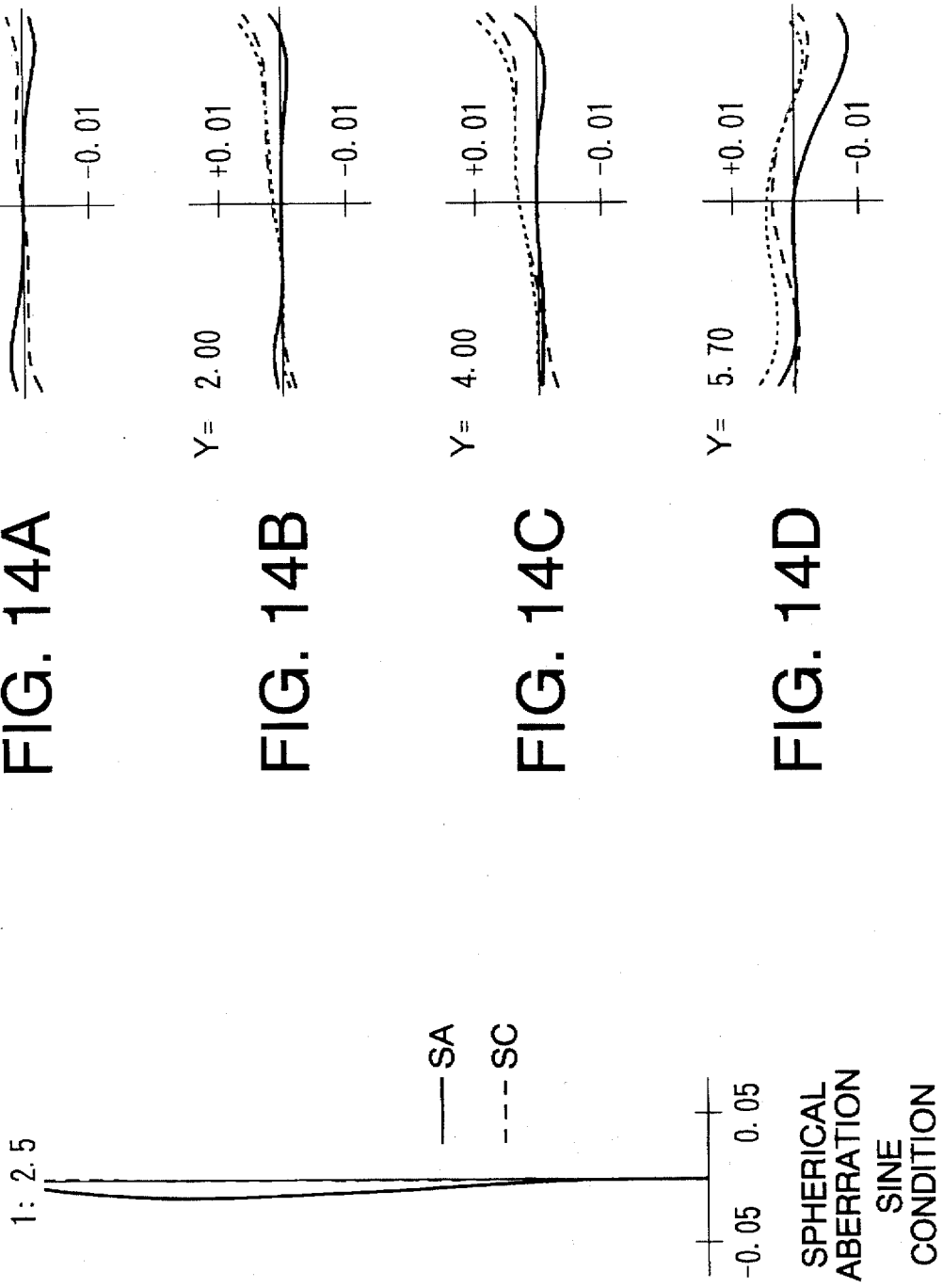

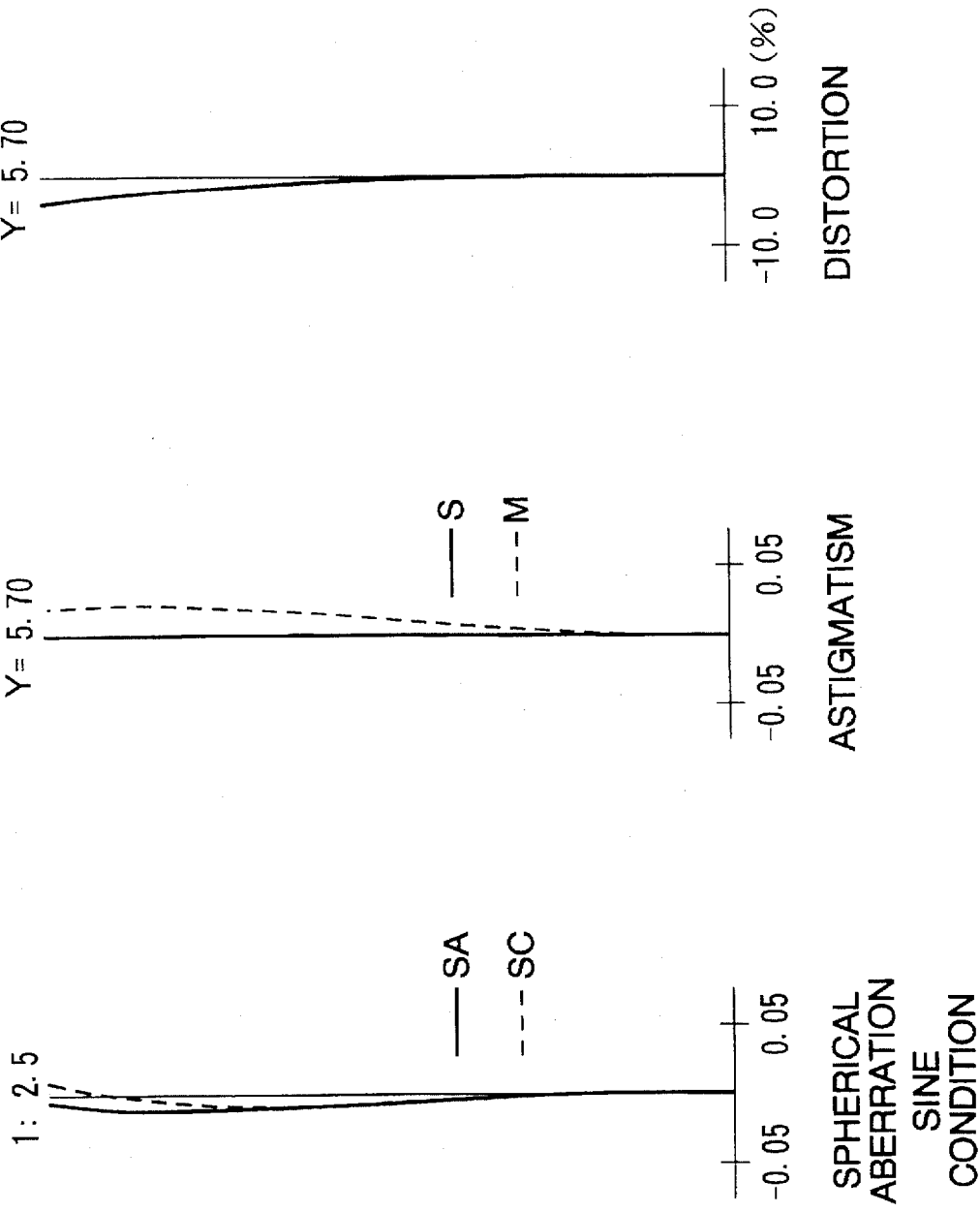

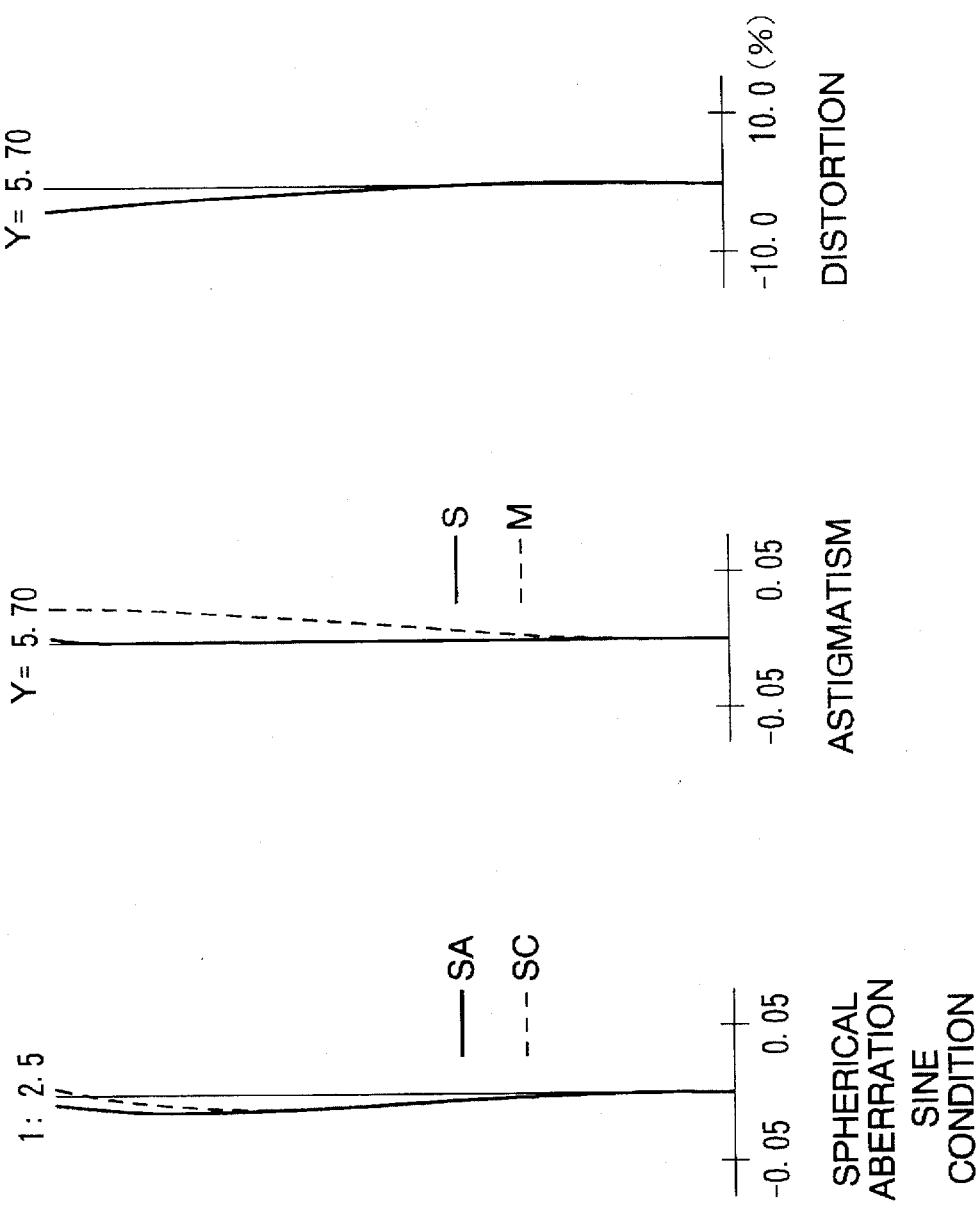

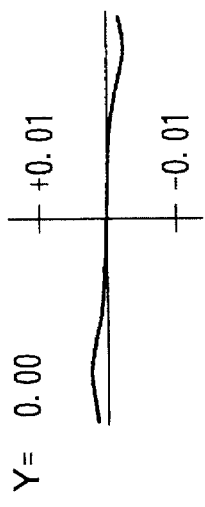
FIG. 21A
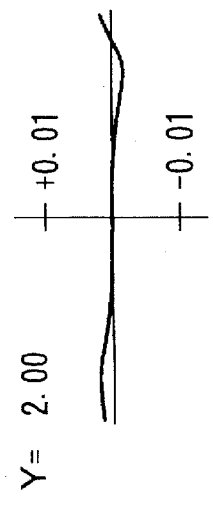
FIG. 21B
FIG. 21C
FIG. 21D
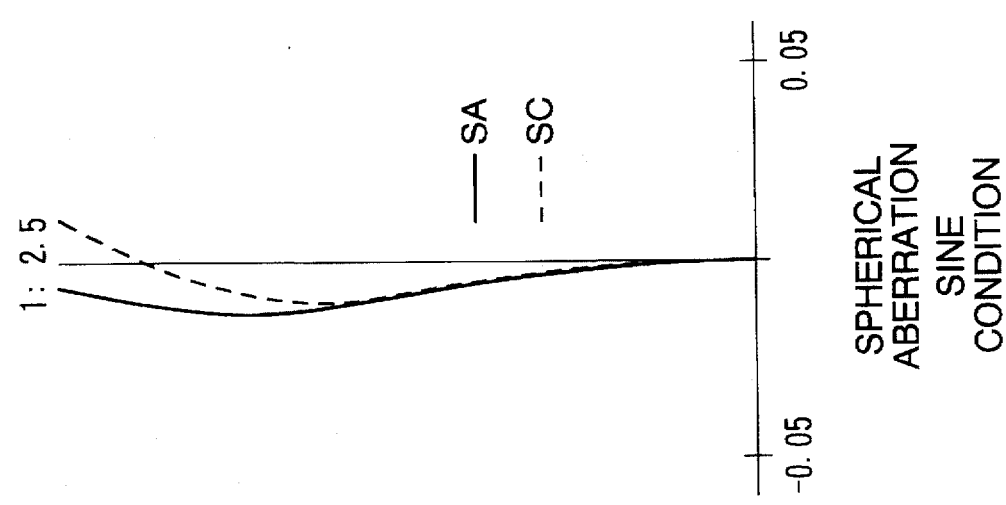
FIG. 20

Y= 0.00

Y= 2.00

Y= 4.00

Y= 5.70

SPHERICAL ABERRATION SINE CONDITION y = -5.12mm
z = 2.48mm

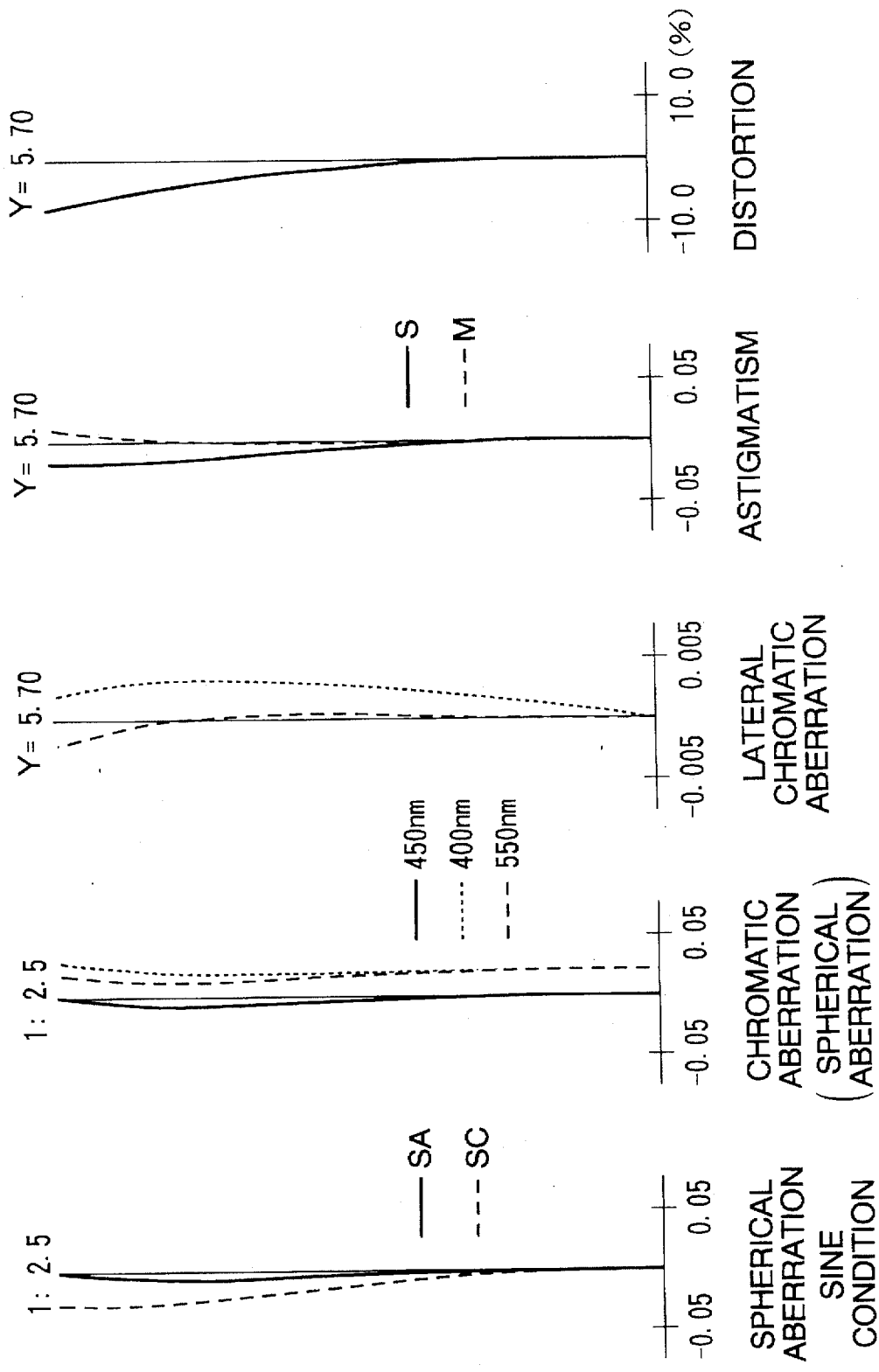

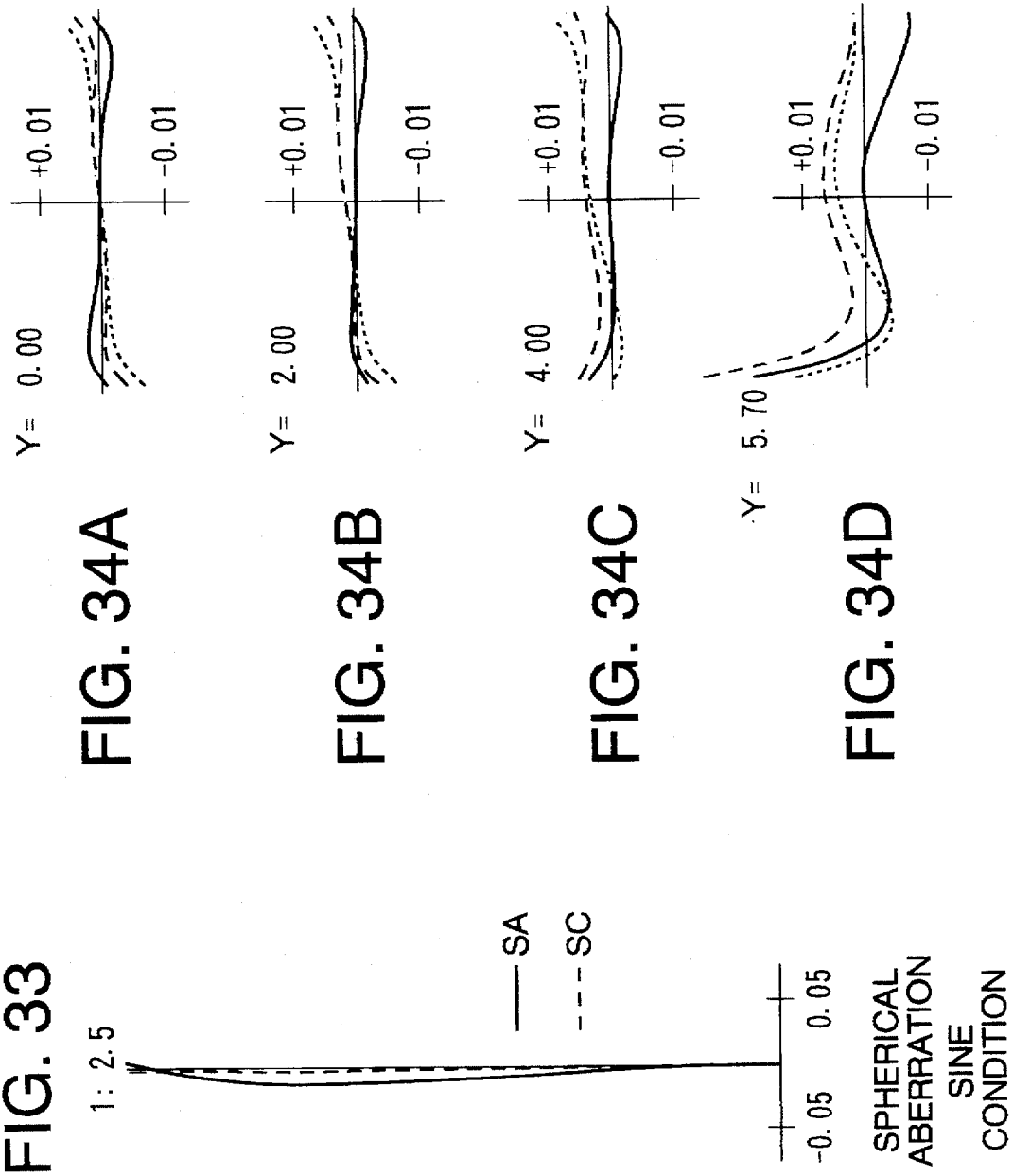

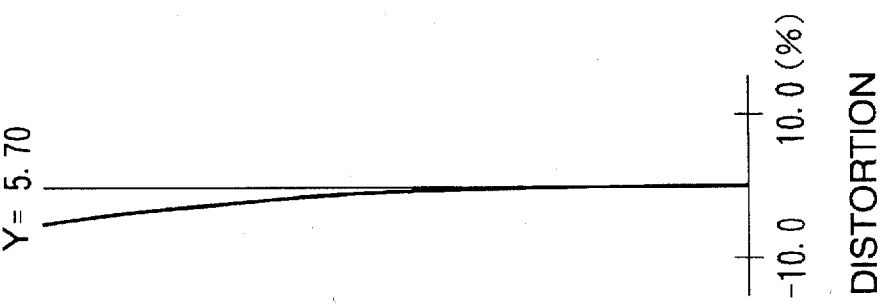
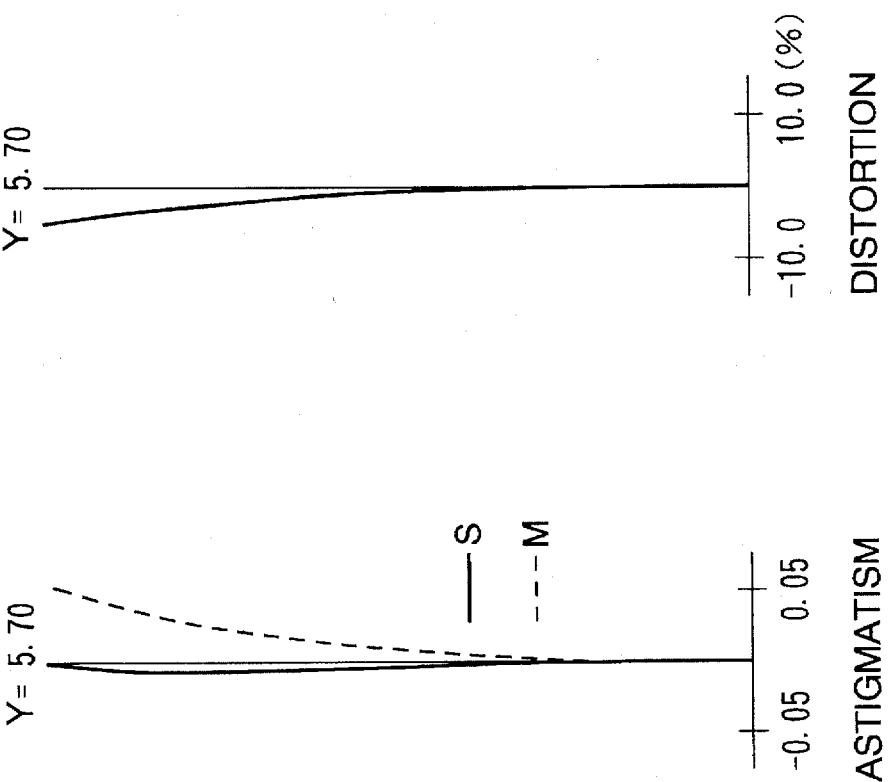
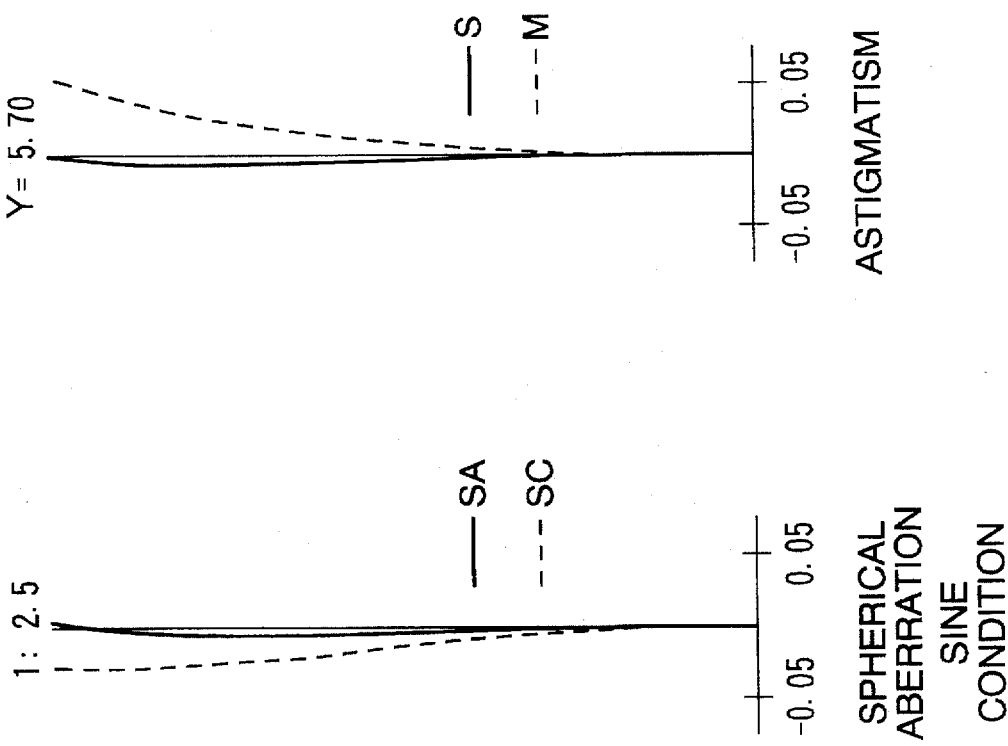

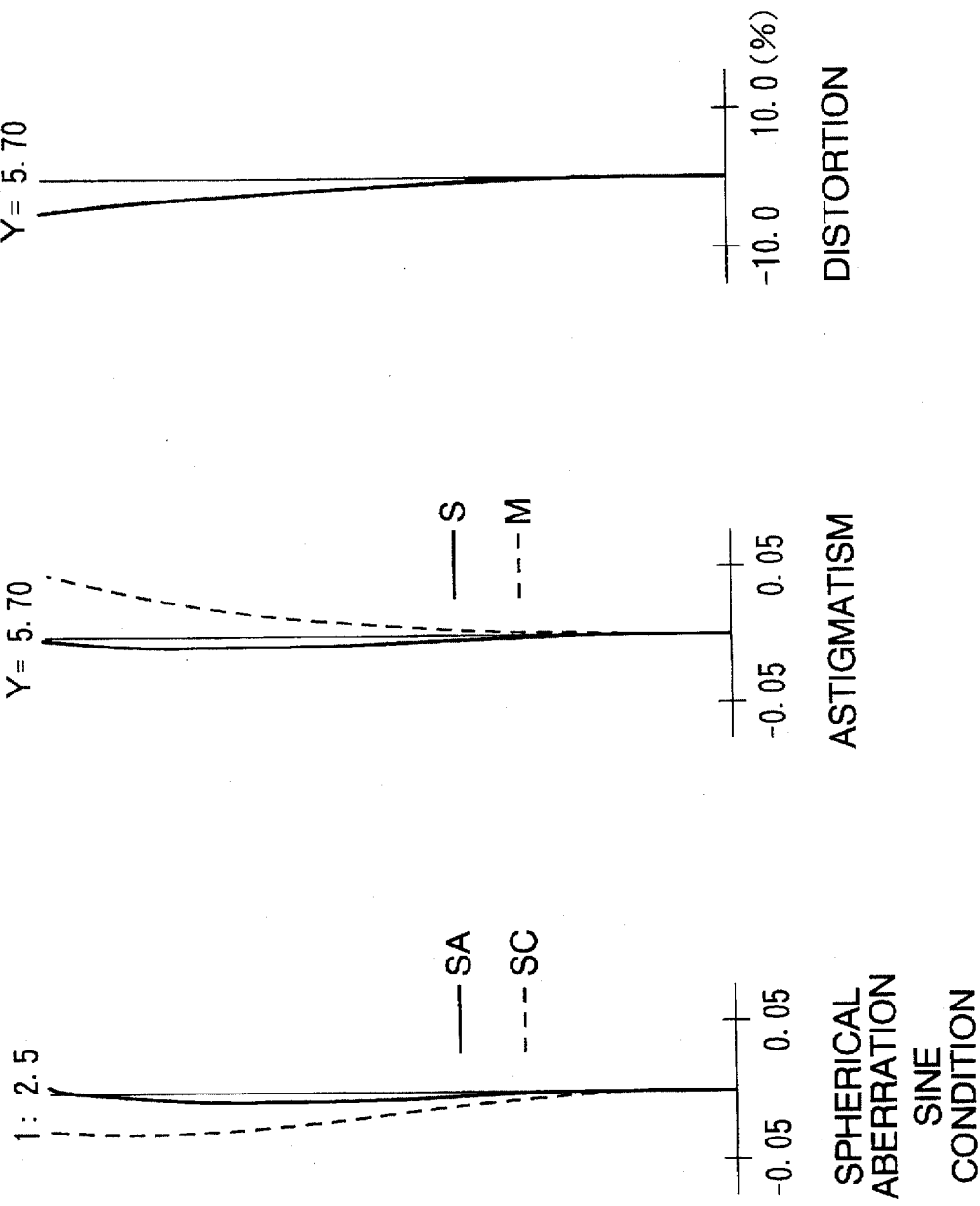

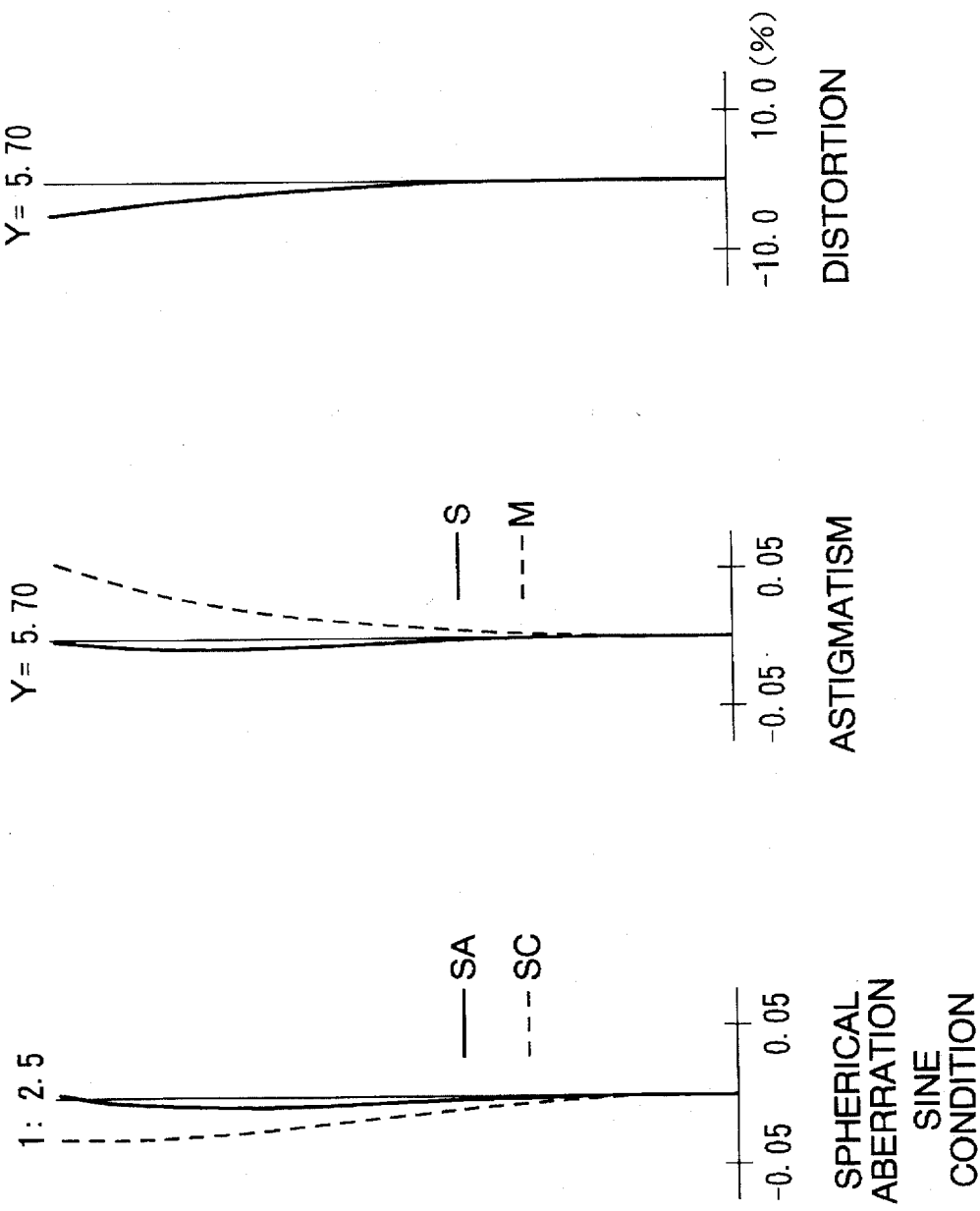

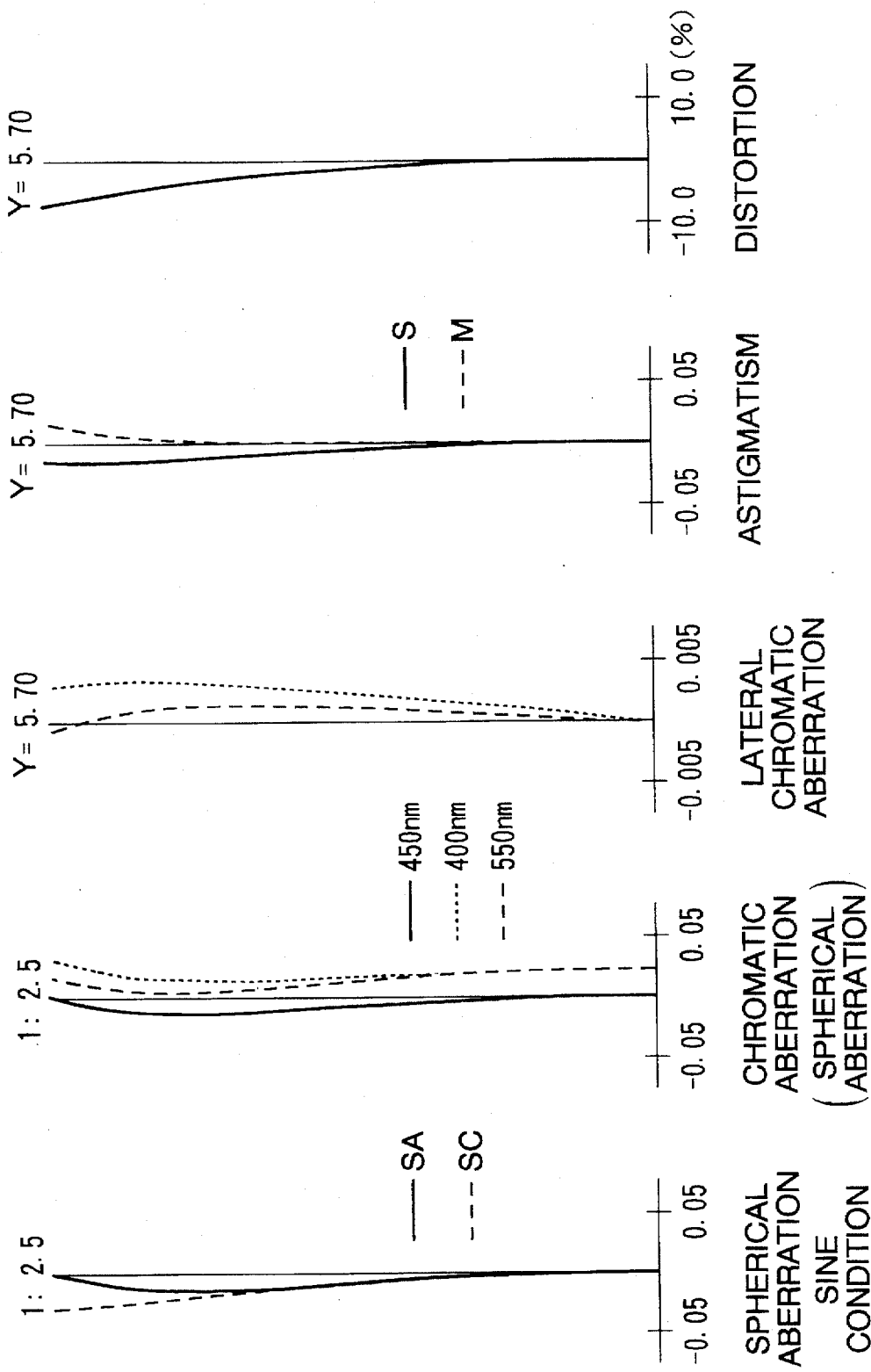

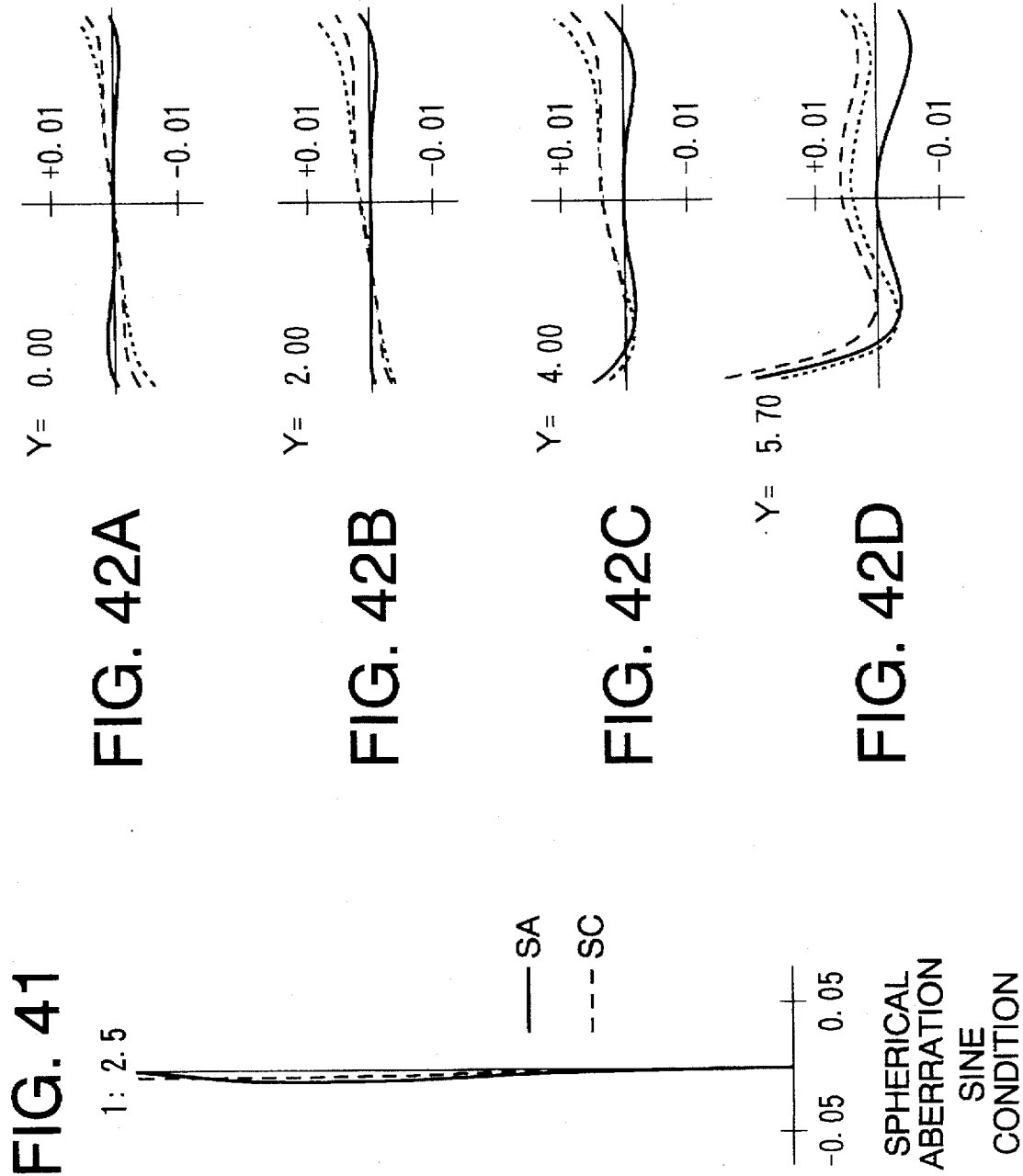

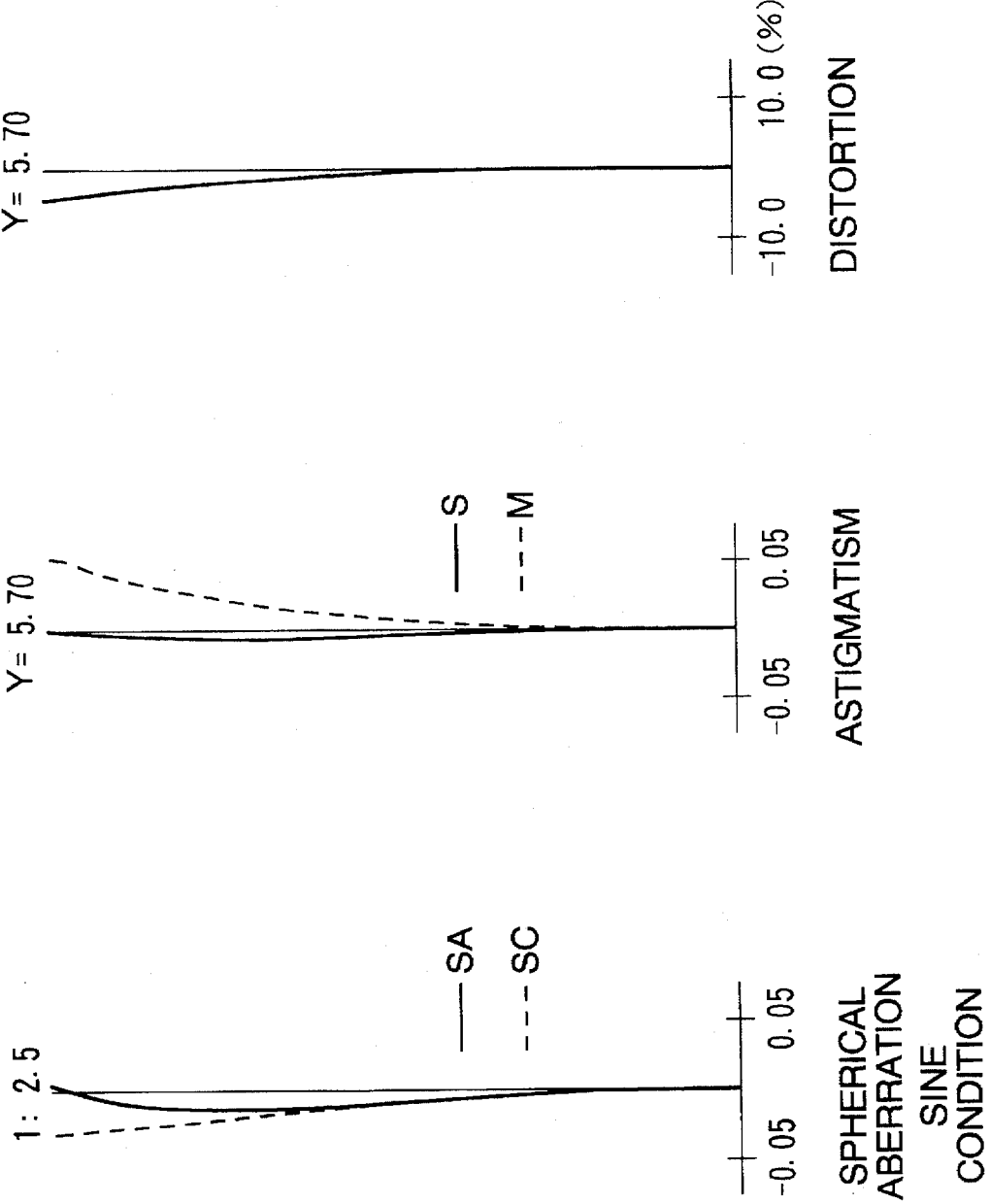

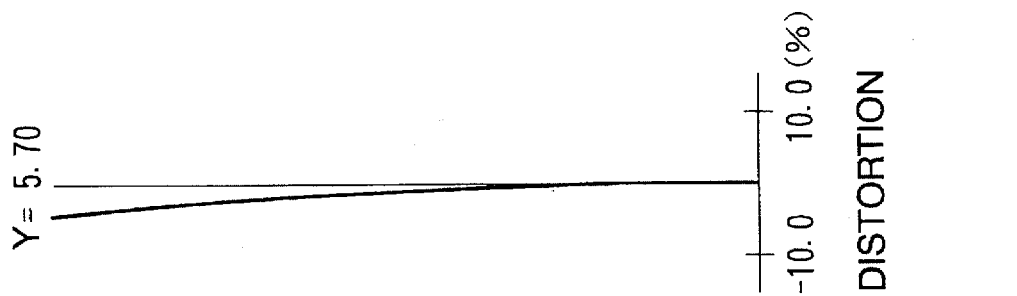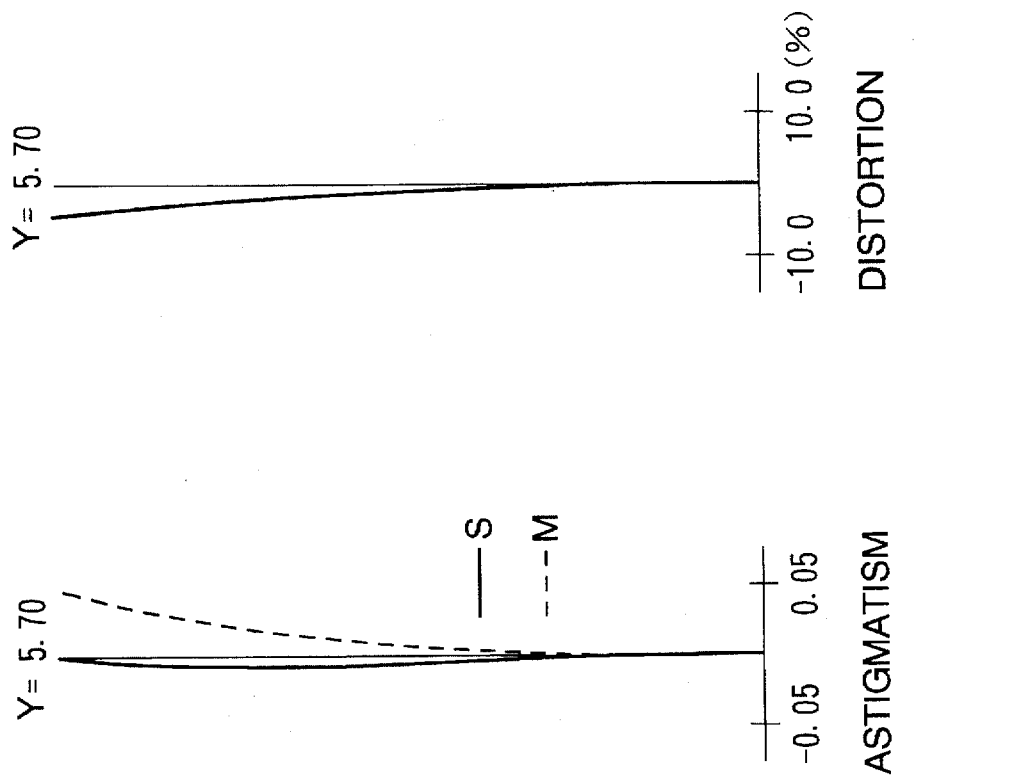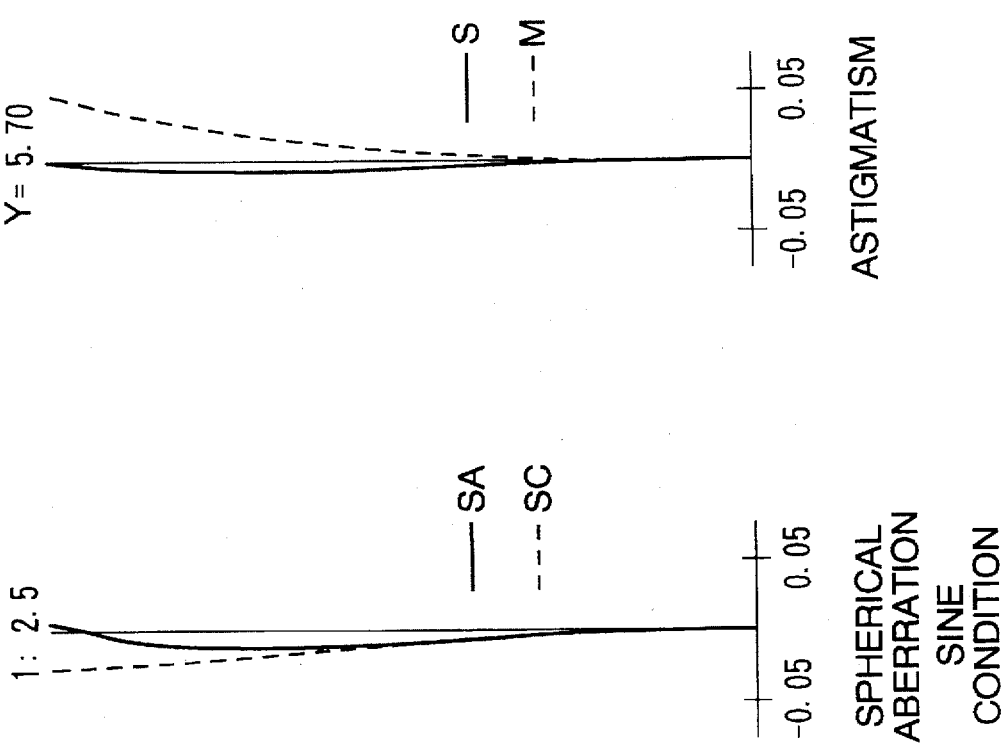

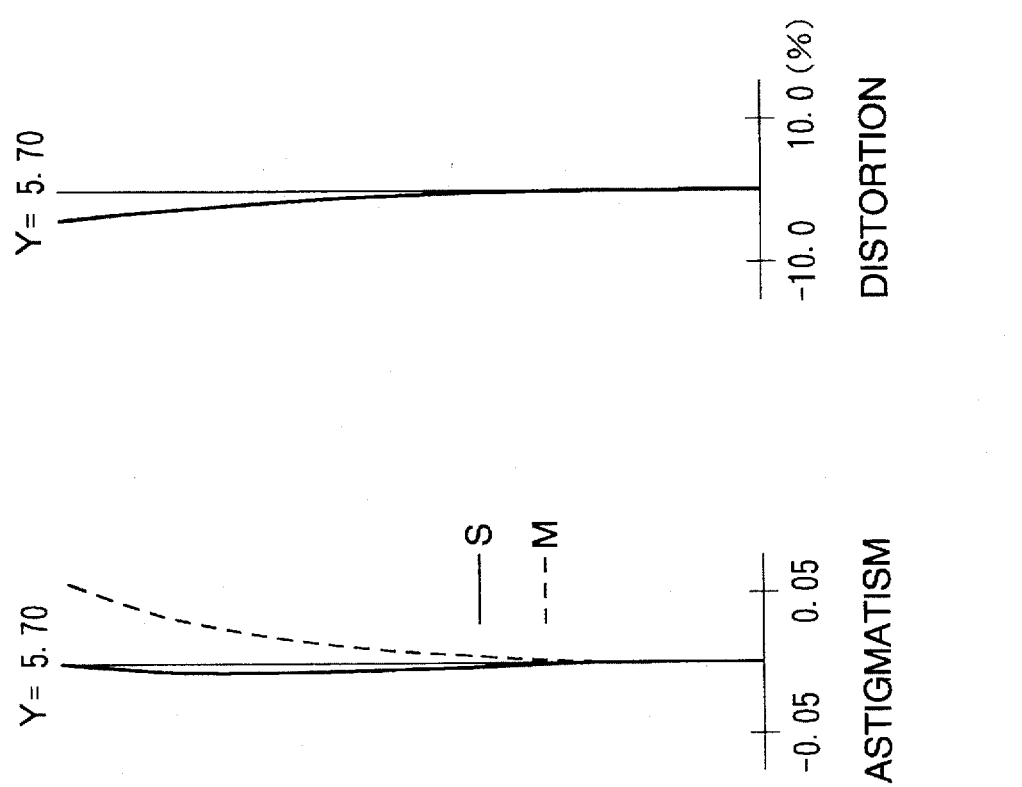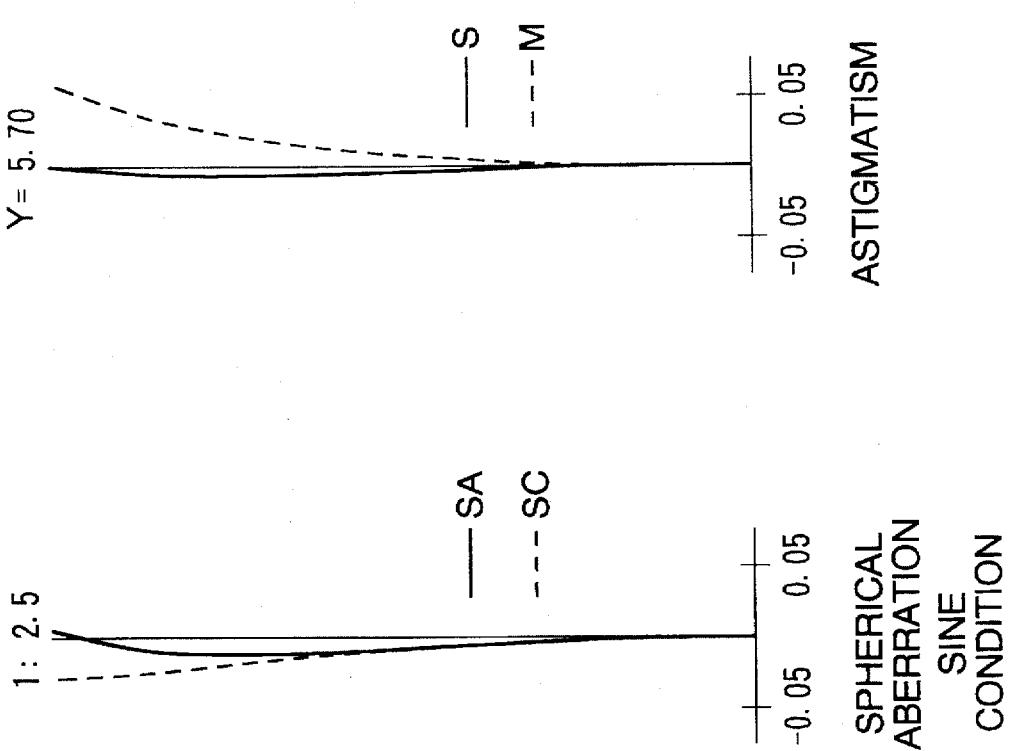

MULTIBEAM RECORDING DEVICE

BACKGROUND OF THE INVENTION

The present invention relates to a recording device for projecting a two-dimensional pattern through a reduction lens system.

A known multibeam recording device is disclosed in Japanese Provisional Patent Publication HEI 6-186490. In the device disclosed therein, a two dimensional array of semiconductor lasers and corresponding apertures form an emitter unit, and the emitter unit emits beams focused on a recording medium through a reduction lens system, the beams forming dot images on the recording medium By scanning a photosensitive recording medium, a pattern is recorded. In the publication, a photosensitive drum as the recording medium is disclosed. In a multibeam recording device, in order to ease restrictions of positional accuracy for the emitter unit and the recording medium, the publication discloses a reduction lens system having an afocal optical system, telecentric for the emitter unit and the photosensitive medium.

However, the publication does not disclose any adjustment for the focusing position. Since various kinds of photosensitive media having different thicknesses are used, focusing can be performed by moving the entire optical system or the recording medium in the direction of the optical axis, bringing the focusing plane into coincidence with different media. However, if the recording medium, the emitter unit, or the optical system are relatively large, a large moving mechanism is needed to move the entire optical system or She entire recording medium. A large mechanism has a slow response time, insufficient for auto-focusing operations to respond to variations in the surface position of the media.

Furthermore, when the reduction lens system is afocal, if inaccuracies in manufacturing or assembly cause magnification errors, it is impossible to compensate for the magnification error by moving the entire lens in the direction of the optical axis.

Still furthermore, the lenses included in a reduction lens system inevitably contain positional inaccuracies due to assembly errors or the like. When a two dimensional pattern provided at the emitter unit is projected on a predetermined recording medium, if one or more lens elements are decentered, the formed pattern includes decentering distortion (for example, trapezoidal distortion) and the accuracy of the formed pattern is compromised.

Lastly, the disclosed system has insufficient resolution. The employed semiconductor lasers have a relatively long wavelength, and the minimum dot image size that can be formed is relatively large, limiting the recording resolution. The minimum dot image size has a positive correlation with the wavelength of the beam. Accordingly, longer wavelength light sources do not allow sufficient resolution. However, optical glass used for lenses has a tendency such that when the wavelength of the light is short, the change in refractive index according to the wavelength is great. That is, in usual optical glasses, shorter wavelengths create larger dispersion. Therefore, when a beam having a shorter wavelength is used, it is difficult to compensate secondary spectrum using lenses made from standard optical glasses.

SUMMARY OF THE INVENTION

It is therefore an object of the invention to provide an improved multibeam recording device capable of quickly adjusting the focusing point using a relatively small moving mechanism. It is a further object of the invention to provide an improved multibeam recording device having a reduction lens system telecentric with respect to the light source and to the photosensitive medium, but that allows adjustment of magnification. It is a still further object of the invention to provide an improved multibeam recording device capable of reducing distortion caused by decentering of the lens elements. Yet another object is to provide an improved reduction lens system for a multibeam recording device allowing the use of a light source having a short wavelength which is used in order to increase the recording resolution.

In order to satisfy the objects of the invention, according to one aspect of the present invention, a multibeam recording device includes an emitter unit having a plurality of light sources arranged in a two-dimensional pattern, a reduction lens system for focusing beams emitted by the emitter unit on a photosensitive surface, the reduction lens system including a positive first lens group, for forming collimated beams from light emitted by the emitter unit, and a second lens group, for converging the collimated beams formed by the first lens group, mechanism driving the second lens group along the optical axis direction thereof, and a mechanism for controlling the driving mechanism to maintain an in-focus condition of the reduction lens system with respect to the photosensitive surface. Preferably, the emitter unit includes a plurality of apertures, each aperture corresponding to one of the plurality of light sources.

In this manner, since the beams between the first and second lens groups are collimated, the second lens group can be moved to automatically focus the reduction lens system without changing the magnification and without significantly increasing aberrations.

Preferably, spherical aberration and coma are compensated within the first lens group and spherical aberration and coma are compensated within in the second lens group. Accordingly, deterioration of the imaging characteristics of the reduction lens system when the second lens group is moved in the optical axis direction is prevented.

In one particular development, the multibeam recording device further includes a focus condition detection mechanisms for detecting the in-focus condition of the reduction lens system with respect to the photosensitive surface. Accordingly, even if the photosensitive surface has irregularity or waviness, the focus condition detecting mechanism can maintain the in-focus condition in combination with the controlling mechanism and driving mechanism.

In another particular development, the light sources emit light having a wavelength range within the range of blue light. Consequently, the resolution of the projected pattern is improved due to the positive correlation between dot image size and illumination wave length.

According to another aspect of the present invention, a multibeam recording device includes an emitter unit having a two-dimensionally arranged plurality of light sources, a reduction lens system for projecting and focusing beans emitted by the emitter unit onto a photosensitive surface, the reduction lens system including, in order from the emitter unit, a positive first lens group and a positive second lens group, an adjusting mechanism for varying the magnification of the reduction lens system by varying a distance between the first lens group and the second lens group, wherein the reduction lens system is telecentric with respect to both the emitter unit and the photosensitive surface. Preferably, a rear focal point of the first lens group is located outside of the first lens group, and a front focal point of the second lens group is located inside the second lens group.

In one particular development, the light sources emit light having a wavelength range within the range of blue light. Consequently, the resolution of the projected pattern is improved due to the positive correlation between dot image size and illumination wave length.

In still another aspect of the present invention, a multibeam recording device includes an emitter unit having a two-dimensionally arranged plurality of light sources, a reduction lens system for projecting and focusing beams emitted by the emitter unit onto an image plane, the reduction lens system including a plurality of lens elements, a lens moving mechanism for moving at least one of the plurality of lens elements along the optical axis thereof to adjust magnification of the reduction lens system. Preferably, the reduction lens system is an afocal optical system.

In one particular development of this aspect of the invention, the reduction lens system includes a first lens group and a second lens group, the first lens group being closer to the emitter unit than the second lens group and forming a substantially collimated flux of light.

According to yet another aspect of the invention, a multibeam recording device includes an emitter unit having a two-dimensionally arranged plurality of light sources, a reduction lens system for projecting and focusing beams emitted by the emitter unit onto an image plane, the reduction lens system including a plurality of lens elements, a decentering compensation mechanism for adjusting at least two of the plurality of lens elements to compensate for decentering distortion in the reduction lens system.

At least two lens elements must be made independently adjustable because decentering distortion due to assembling or manufacturing inaccuracies contains two distortion components that may not be completely canceled by adjusting only one lens element. By providing individually movable lenses, the decentering aberration can be cancelled.

In one particular development of this aspect of the invention, the reduction lens system includes, in order from the emitter unit side, a first lens group including a condenser lens, and a second lens group, and wherein the condenser lens is held in a first lens frame, remaining elements of the first lens group excluding the condenser lens held in a second lens frame, and the second lens group is held in a third lens frame, and wherein each of the first lens frame, the second lens frame, and the third lens frame, are separately supported, and wherein at least two of the first lens frame, the second lens frame, and the third lens frame are adjustable by a decentering compensation mechanism to compensate for decentering distortion in the reduction lens system.

Preferably, aberration is compensated for within the first lens group and aberration is compensated for within the second lens group.

Since the aberration of the first lens group and second lens groups are independently compensated, even if the condenser lens and image side lens group are independently adjusted to correct decentralizing distortion, coma is suppressed.

In another particular development of this aspect of the invention, further included is a lens moving mechanism for moving the third lens frame in the direction of the optical axis of the reduction lens system to focus the reduction lens system, and wherein the decentering compensation mechanism includes a mechanism for independently adjusting the first lens frame for decentering, and a mechanism for independently adjusting the second lens frame for decentering. Decentering includes both shifting and tilting movement.

Accordingly, even if the second lens group is moved the direction of the optical axis, the characteristics of the optical system as a whole are maintained.

Preferably, the decentering compensation mechanism includes mechanism for moving at least one of the lens frames parallel to a plane normal to the optical axis of the reduction lens system. Further preferably, the decentering compensation mechanism includes mechanism for tilting at least one of the lens frames so that the optical axes of the lenses held therein tilts with respect to the optical axis of the reduction lens system.

In this manner, decentering aberration in any direction can be canceled by allowing the two lens groups and to move in two different directions and to tilt about two different axes.

According to still yet another aspect of the present invention, a reduction lens system, includes in order from an object side of the lens a positive first lens group and a positive second lens group. The positive second lens group contains an aperture stop, and at least one positive lens element formed from anomalous dispersion glass, the positive lens element or, elements being on an image side of the aperture stop. The positive lens element or elements are formed from anomalous dispersion glass. The anomalous dispersion glass satisfies a first condition: $\nu > 70$, $\nu$ being the Abbe number of the glass, and a second condition: $\theta ig - \theta' ig > 0.10$. $\theta ig$ is a partial dispersion ratio calculated according to a first formula: $\theta ig = (ni - ng)/(nF - nC)$. In this first formula, $ni$, $ng$, $nF$, and $nC$ being indices of refraction for spectral lines i, g, F, and C, respectively. $\theta' ig$ is a predetermined point on a line connecting K7 optical glass and F2 optical glass on a correlation chart of $\theta ig$ versus $\nu$, $\theta' ig$ is calculated according to a second formula: $\theta ig = -8.374 \times 10^{-3} \times \nu + 1.725$.

The use of positive anomalous dispersion glass that satisfies the first condition for the positive lenses sufficiently, compensates the secondary spectrum. If the second condition is not satisfied, the anomalous dispersion characteristic is too small and secondary spectrum can not be sufficiently compensated.

Preferably, a positive lens element formed from the anomalous dispersion glass is the closest positive lens element to the aperture stop on the image side thereof. This is particularly helpful for correcting longitudinal chromatic aberration. It is also preferred that a positive lens element formed from the anomalous dispersion glass is the farthest positive lens element from the aperture stop on the image side thereof. This is particularly helpful for correcting lateral chromatic aberration. In one particular embodiment, all positive lens elements on the image side of the aperture stop are formed from the anomalous dispersion glass. This is particularly helpful for correcting lateral and longitudinal chromatic aberration.

The second lens group may include at least one negative lens element formed from the anomalous dispersion glass on an object side of the aperture stop. In this case, a negative lens element formed from the anomalous dispersion glass is the farthest negative lens element from the aperture stop on the object side thereof.

In a further aspect of the invention, a multibeam recording device, includes an emitter unit including a plurality of two-dimensionally arranged blue light sources and a reduction lens system. The reduction lens system includes, in order from an object side of the lens a positive first lens group and a positive second lens group. The positive second leas group contains an aperture stop and at least one positive lens element formed from anomalous dispersion glass on an image side of the aperture stop. The positive lens element or elements are formed from anomalous dispersion glass. The anomalous dispersion glass satisfies a first condition: $\nu > 70$, ν being the Abbe number of the glass, and a second condition: θig−θ'ig>0.10. θig is a partial dispersion ratio calculated according to a first formula: θig=(ni−ng)/(nF−nC). In the first formula, ni, ng, nF, and nC are indices of refraction for spectral lines i, g, A, and C, respectively, and θ'ig is a predetermined point on a line connecting K7 optical glass and F2 optical glass on a correlation chart of θig versus ν. θ'ig is calculated according to a second formula: θ'ig=−8.374×10$^{-3×ν}$+1.725. Beams emitted by the emitter unit are focused on a predetermined image forming plane through the reduction lens system.

BRIEF DESCRIPTION OF THE DRAWINGS

FIGS. 10A through 10E are charts showing, respectively, the spherical aberration SA and sine condition SC, chromatic aberration, lateral chromatic aberration, astigmatism, and distortion of the first example of a reduction lens system;

FIG. 11 is a chart showing spherical aberration of the first lens group of the first example reduction lens system applied in at least the first embodiment;

FIGS. 12A through 12D are charts showing transverse aberration of the first lens group of the first example reduction lens system applied in at least the first embodiment;

FIG. 13 is a chart showing spherical aberration of the second lens group of the first example reduction lens system applied in at least the first embodiment;

FIGS. 14A through 14D are charts showing transverse aberration of the second lens group of the first example reduction lens system applied in at least the first embodiment;

FIGS. 15A through 15C are charts showing, respectively, spherical aberration, astigmatism and distortion of the first example of a reduction lens system as applied to the second embodiment;

FIGS. 17A through 17C are charts similar to FIGS. 15A through 15C, respectively, showing a result when a second lens group is moved in a second direction;

FIG. 20 is a chart similar to FIG. 18, showing the result of a movement of a condenser lens in a first direction;

FIGS. 21A through 21D are charts similar to FIGS. 19A through 19D, respectively, showing the result of a movement of a condenser lens in a first direction;

FIGS. 32A through 32E are charts showing, respectively, the spherical aberration SA and sine condition SC, chromatic aberration, lateral chromatic aberration, astigmatism, and distortion of the second example of a reduction lens system;

FIG. 33 is a chart showing spherical aberration of the second lens group of the second example reduction lens system applied in at least the first embodiment;

FIGS. 34A through 34D are charts showing transverse aberration of the second lens group of the second example reduction lens system applied in at least the first embodiment;

FIGS. 35A through 35C are charts showing, respectively, spherical aberration, astigmatism and distortion of the second example of a reduction lens system as applied to the second embodiment;

FIGS. 36A through 36c are charts similar to FIGS. 35A through 35C, respectively, showing a result when a second lens group is moved in a first direction;

FIGS. 37A through 37C are charts similar to FIGS. 35A through 35C, respectively, showing a result when a second lens group is moved in a second direction;

FIGS. 40A through 40E are charts showing, respectively, the spherical aberration SA and sine condition SC, chromatic aberration, lateral chromatic aberration, astigmatism, and distortion of the third example of a reduction lens system;

FIG. 41 is a chart showing spherical aberration of the second lens group of the third example reduction lens system applied in at least the first embodiment;

FIGS. 42A through 42D are charts showing transverse aberration of the second lens group of the third example reduction lens system applied in at least the first embodiment;

FIGS. 43A through 43C are charts showing, respectively, spherical aberration, astigmatism and distortion of the third example of a reduction lens system as applied to the second embodiment;

FIGS. 44A through 44C are charts similar to FIGS. 43A through 43C, respectively, showing a result when a second lens group is moved in a first direction; and FIGS. 45A through 45C are charts similar to FIGS. 43A through 43C, respectively, showing a result when a second lens group is moved in a second direction.

DETAILED DESCRIPTION OF THE PREFERRED EMBODIMENTS

Four embodiments of la multibeam recording device and three examples of improved reduction lens systems are disclosed herein.

Figure 1:
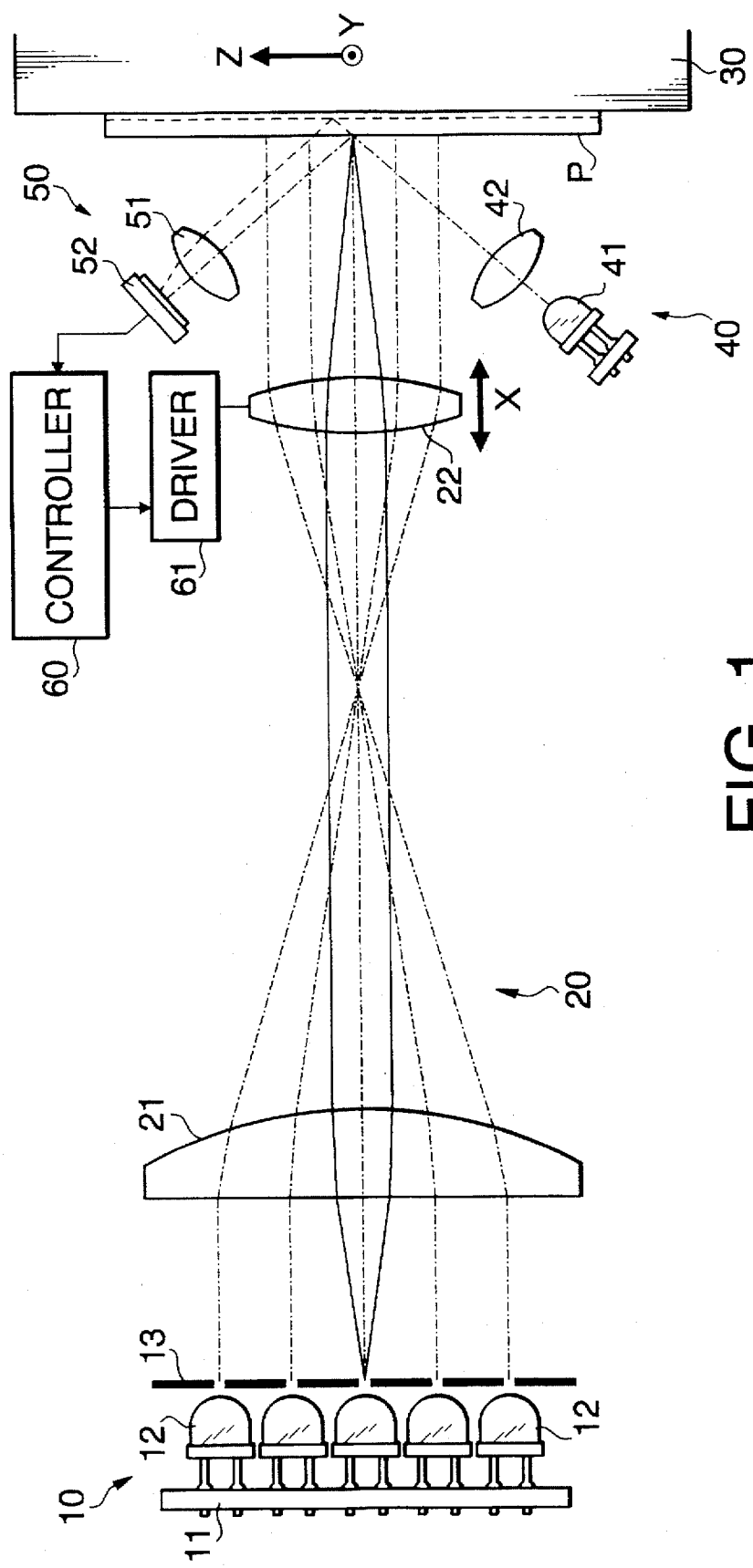
FIG. 1 is a schematic top view showing a first embodiment of a multibeam recording device according to the invention.

FIG. 1 shows a first embodiment of a multibeam recording device according to the invention. The multibeam recording device includes an optical unit containing an emitter unit 10 and a reduction lens system 20, capable of moving along a Z direction perpendicular to the optical axis of the reduction lens system 20. The emitter unit 10 includes a plurality of light sources arranged in a two-dimensional array. The reduction lens system 20 includes a positive first lens group 21 and a positive second lens group 22.

A movable table 30 supports a photosensitive medium P. The photosensitive medium P is an orthochromatic plate having a spectral sensitivity from 400 nm to 570 nm wavelength. The table 30 can move along a Y direction that is perpendicular to both the z and optical axes (X). That is, by moving the optical- unit and the table 30, the relative Z-Y position of the optical unit and the recording medium P can be changed, and a complex image can be formed on the recording medium P.

The emitter unit 10 includes a light emitting diode (LED) array formed from many LED's 12 (in this case, 2048 LED's) attached to a substrate 11, and an aperture plate 13 having a number of apertures in positions corresponding to each of the LED's 12. The LED's 12 are blue light emitting diodes having a peak wavelength of 450 nm. The 2048 LED's 12 and apertures of the aperture plate 13 are each arranged in a two-dimensional matrix having 32 rows extending in the Z direction and 64 angled columns extending in the Y direction. The light emitted from the LED's 12 passes through the apertures in the aperture plate 13 and is projected by the reduction lens system 20 onto the photosensitive medium P. The images of the apertures are formed as dot images on the photosensitive medium P.

The reduction lens system 20 is an afocal optical system telecentric to both of the emitter unit 10 and to the photosensitive medium P. Since the reduction lens system 20 is telecentric with respect to the emitter unit 10, all of the emitted principal rays can be directed along the optical axis of the reduction lens system. Furthermore, even if the emitter unit 10 shifts along the optical axis, the magnification remains unchanged. Still further, since the reduction lens system 20 is telecentric with respect to the photosensitive medium P. If the photosensitive medium P has irregularities or waviness or focusing errors occur, the position of the projected pattern remains unchanged. That is, the magnification of the pattern formed on the photosensitive medium P does not vary.

As shown in FIG. 1, in the first embodiment of the multibeam recording device, a driver 61 moves the second lens group 22 along the optical axis direction (the X axis) to adjust the focusing point of the reduction lens system 20.

In the first embodiment, the first lens group 21 of the reduction lens system 20 makes the light beam emitted by the emitter unit 10 a collimated beam, and the second lens group 22 converges the light beam transmitted through the first lens group 21 onto the photosensitive medium P. Since the beams of light emitted by the emitter unit 10 are collimated between the first lens group 21 and the second lens group 22, the magnification of the reduction lens system 20 does not change when the second lens group 20 is moved to maintain an in-focus condition.

For example, the photosensitive medium P is a mask for a printed circuit board (PCB), or alternatively a PCB to which a photoresist layer has been applied. The difference of the thickness of these two media is approximately 6 mm, and the maximum surface irregularity or waviness is about 250 µm. In this first variation, both the difference in thickness for different media and the surface irregularity or waviness of the photosensitive medium P are taken into account. The driver 61 can vary the focusing point within a range of approximately ±47 mm.

As shown in FIG. 1, a focus detection unit, including a focusing illumination unit 40 and a light receiving unit So, is provided between the second lens group 22 and the table 30. An auto-focus function is provided by the focus detection unit, a controller 60, and the driver 61. The auto-focus function can control the focusing condition, offsetting the reduction of allowance of focusing error that is a result of increasing the recording resolution by the use of blue LED's 12. The focusing illumination unit 40 includes an LED 41 that emits light having a wavelength out of the spectral sensitivity of the photosensitive medium P, and a projection lens 42. The light from the focusing illumination unit 40 is obliquely projected onto the photosensitive medium P from a position away from the optical axis of the reduction lens system 20.

The light receiving unit 50 includes a converging lens 51 and a position sensing device (PSD) 52. Light emitted by the focusing illumination unit 40 and reflected by the photosensitive medium P is converged by the converging lens 51 onto the PSD 52. The output of the PSD 52 is input to a controller 60, which controls the driver 61 to move the second lens group 22 such that the focusing point of the reduction lens system 20 is coincides with the surface of the photosensitive medium P.

The PSD 52 outputs a signal corresponding to a position of the converged reflection light. The position of the converged reflection light varies depending on the position of the photosensitive medium P in the direction of the optical axis. For example, if the surface of the photosensitive medium P moves or varies away from an in-focus position (shown by a solid line in FIG. 1) to an out-of-focus position (shown by a dashed line in FIG. 1), the is position of the converged reflection light on the PSD 52 varies accordingly, and the controller 60 controls the driver 61 to move the second lens group by a direction and amount determined by the output of the PSD 50 to return the focusing point to an in-focus condition.

Figure 2:
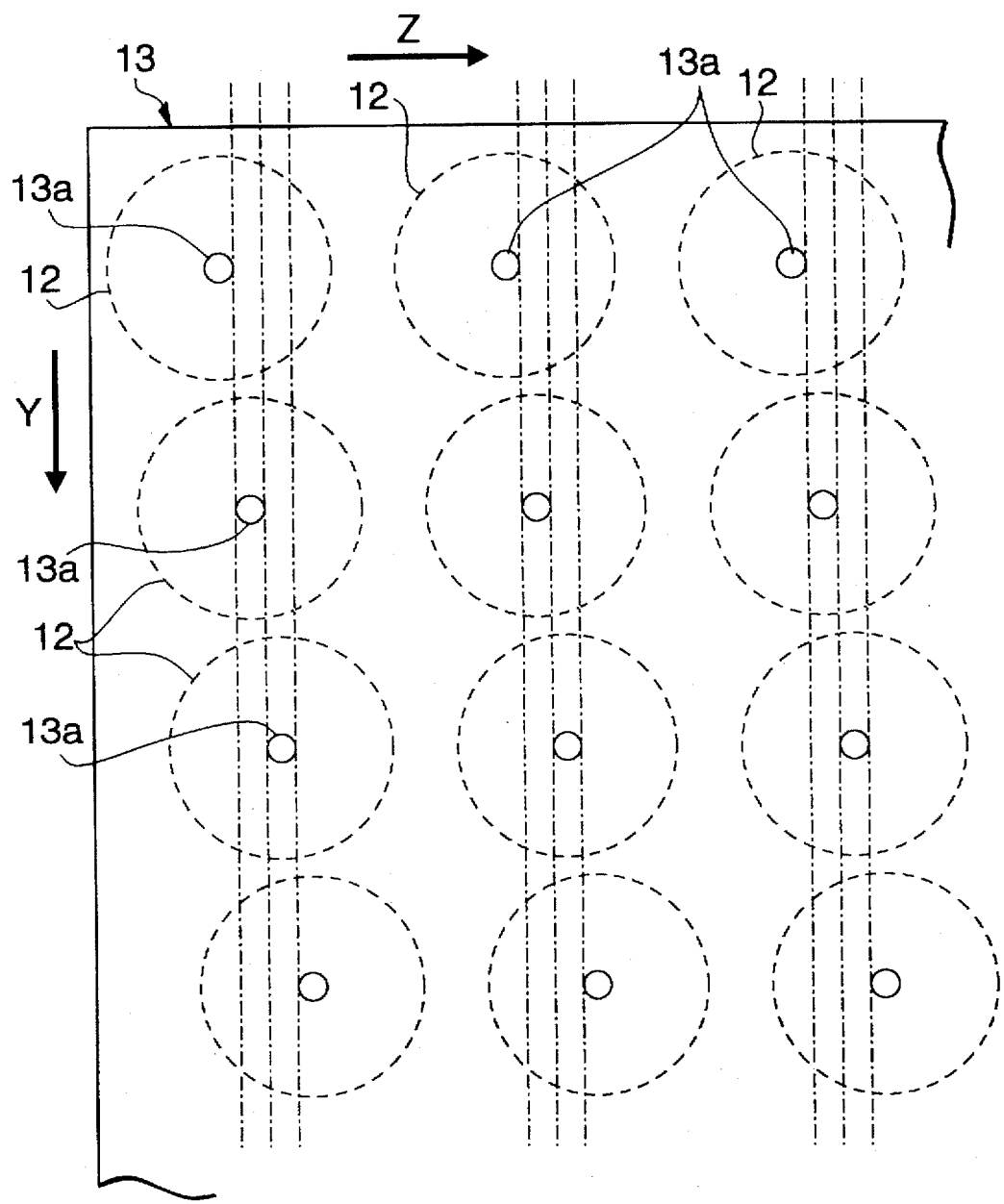
FIG. 2 is a partial top view of an aperture plate of the embodiments of the invention.

FIG. 2 is a partial top view of the aperture plate 13, viewed from the substrate 11 side of the emitter unit 10. As described, the aperture panel 13 has 2048 apertures 13A, each aperture 13A corresponding to an LED's 12. The rows of apertures 13A are arranged to extend in a line parallel to the Z directions and the distance between adjacent apertures in the Z direction is larger than the diameter of each LED 12, being equal to the diameter of each aperture 13A multiplied by the number of rows extending in the Z direction. In this case, the distance between adjacent apertures in the Z direction is thirty-two times the diameter of each aperture 13a. Each row of evenly spaced apertures 13A is shifted in the Z direction from the previous row by a distance equal to the diameter of each aperture 13A, giving the angled columns extending generally in the Y direction. The centers of the LED's 12 coincide with the centers of the apertures 13A.

To form each line of an area image pattern, selectively illuminated dot images of the apertures 13A in each row are incident on the photosensitive medium P in succession for each line of image data as the table 30 moves in the Y direction. Since 32 rows of apertures 13A are provided, each aperture 13A in a row being separated from an the adjacent aperture 13A in the row by thirty-two times the aperture diameter, a full line may be imaged. That is, when the dot images from the LED's in the 32nd and last row are selectively illuminated along the line, most of the line already imaged on the photosensitive medium P by the previous thirty-one rows, the drawing on the line is completed. The area image pattern is formed on every line extending in the Z direction on the photosensitive medium P. In other words, for each line of the area image pattern, 32 line images (each line composed of 64 selectively illuminable dot images) are superimposed to form a line having 2048 tangent and adjacent dot positions.

As the table 30 is driven in a pass along the Y direction and the line images are formed in this manner, a band-like pattern portion is formed from the successive lines, the band-like pattern portion being as wide as the lines (in this case, 2048 dot images wide). When the emitter unit 10 completes a pass scanning from one terminus to the opposite terminus of a pattern on the photosensitive medium P as the table moves along the Y direction, the first pass is complete, the first band-like pattern portion of the complete pattern is formed, and the table 30 is stopped. The optical unit is moved in the Z direction by the width of one band-like pattern portion. Then, the table. 30 is started to move in the reverse direction along the Y direction for a second -pass.

In reverse, the LED's 12 are controlled such that the last row of LED's 12 forms the first set of dot images of the first line image in the reverse direction, followed by the second-last row, and so on. Thus, a second band-like pattern portion of the pattern is formed adjacent to the first in a second pass. When the second pass is complete, and the second band-like pattern portion of the pattern is formed in the reverse direction, the optical unit is moved in the Z direction by the width of the band-like pattern portion again, and a subsequent pass for forming a subsequent (third) band-like pattern portion is formed in the forward direction as previously described.

The process is repeated until a complete pattern is formed from the sequential passes, imaging the adjacent band-like pattern portions in a row to form the complete pattern. The moving amount of the optical unit in the z direction between adjacent band-like pattern portions is controlled so as not to produce overlap or space between the adjacent band-like pattern portions, and to form a complete pattern made of the sequential band-like pattern portions.

To prevent deterioration of the imaging characteristics of the reduction lens system 20 when the second lens group 22 is moved in the optical axis (X) direction, aberrations (particularly spherical aberration and coma) are compensated within each of the first and second lens groups 21 and 22.

In the first embodiment of a multibeam recording device according to the present invention, an emitter unit 10 comprises a plurality of light sources (LED's 12) arranged two dimensionally and a plurality of apertures 13A corresponding to each of the light sources. Light emitted by a light source is focused on a recording medium P through a reduction lens system 20 which has a positive first lens group 21 for forming a collimated beam of the light emitted by the emitter unit 10, and a second lens group 22 for converging the collimated beam transmitted through the first lens group 21. The second lens group 22 is capable of moving along the optical axis (X) direction thereof by means of a driver 61, which is controlled by a controller 60 to maintain an in-focus condition of the reduction lens system 20 with respect to the recording medium P.

As described for the first embodiment, since the focusing point can be moved by moving only the second lens group 22, the driver 61 is smaller than that necessary to move the entire optical system, and accordingly also faster. In a multibeam recording device having a plurality of light sources in the emitter unit 10, the lens closest to the emitter unit (in this case, in the first lens group 21) must be large in order to receive light from all of the light sources in the emitter unit 10. Such a large lens is heavy and unwieldy. By moving the second lens group 22, which is necessarily significantly smaller and lighter than the first lens group 21, the load on the driver 61 is small.

In addition, since LED's 12 that emit light having wavelength in the range of blue light are used in the emitter unit 10, the resolution of the projected pattern is improved due to the positive correlation between dot image size and illumination wave length. Accordingly, the dot size is reduced, allowing increased recording resolution.

Still further, in the described first embodiment of a multibeam recording device, in-focus condition can be maintained by moving only the second lens group 22 allowing a quick-response suitable for auto-focus. Accordingly, even if the photosensitive medium P has irregularity or waviness, the focus detection unit, controller 60, and driver 61 can maintain the in-focus condition.

Furthermore, particularly spherical aberration and coma are compensated within the first leas group 21, and within the second lens group 22. If such compensation were not made within each group individually, but by balancing aberration among the groups, decentering coma, tilt of the image, and distortion would occur when the second lens group 22 is moved for focusing.

Figure 3:
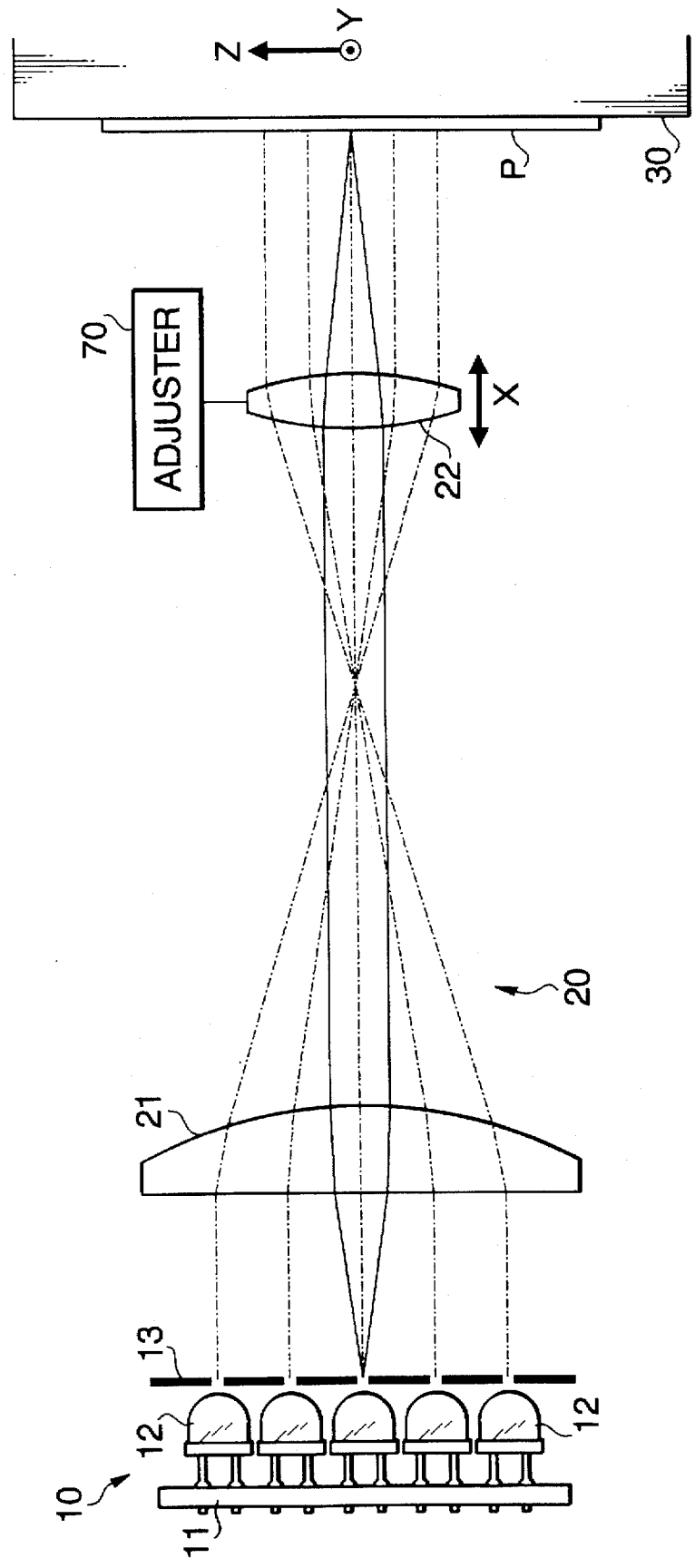
FIG. 3 is a schematic top view showing a second embodiment of a multibeam recording device according to the invention.

FIG. 3 shows a second embodiment of a multibeam recording device according to the invention. Portions of the second embodiment that are not described are identical to those of the first embodiment. The device of the second embodiment is substantially similar to that of the first embodiment, but is without a focusing detection unit.

In the second embodiment, the reduction lens system 20 is substantially afocal and telecentric with respect to both the emitter unit 10 and the photosensitive medium P. An adjuster 70 moves the second lens group 22 of the reduction lens system 20 along the optical axis direction (the X axis). The adjustment of the second lens group 22 varies the distance between the first lens group 21 and the second lens group 22, and varies the magnification of the area image pattern formed on the photosensitive medium P.

Since the reduction lens system 20 is substantially an afocal system, the magnification may not be changed by moving the entire lens. However, in the second embodiment, a predetermined distance between the emitter unit 10 and the reduction lens system 20 is set (different from the first embodiment) such that the beams exiting the first lens group 21 are not in a collimated beam. In the second embodiment, since the beam between the first lens group 21 and second lens group 22 is not collimated, changing the distance between the first lens group 21 and second lens group 22 changes the magnification of the optical system. Aberrations are compensated appropriately for preventing changes in focusing characteristics when the lens groups move. In order to change the distance between the first lens group 21 and second lens group 22, the adjuster 70 moves the second lens group 22. It is preferable to move the second lens group 22, as the first lens group 21 includes a large diameter lens to collect all of the separate light beams from the emitter unit 10.

The second embodiment of the multibeam recording device moves the second lens group 22 so that the magnification can be changed within the range of ±0.26%, where it is assumed that magnification error due to the manufacturing or assembly inaccuracies is about ±0.1%. Specific examples of the reduction lens system 20 enabling this range are described following the description of the embodiments.

Figure 4:
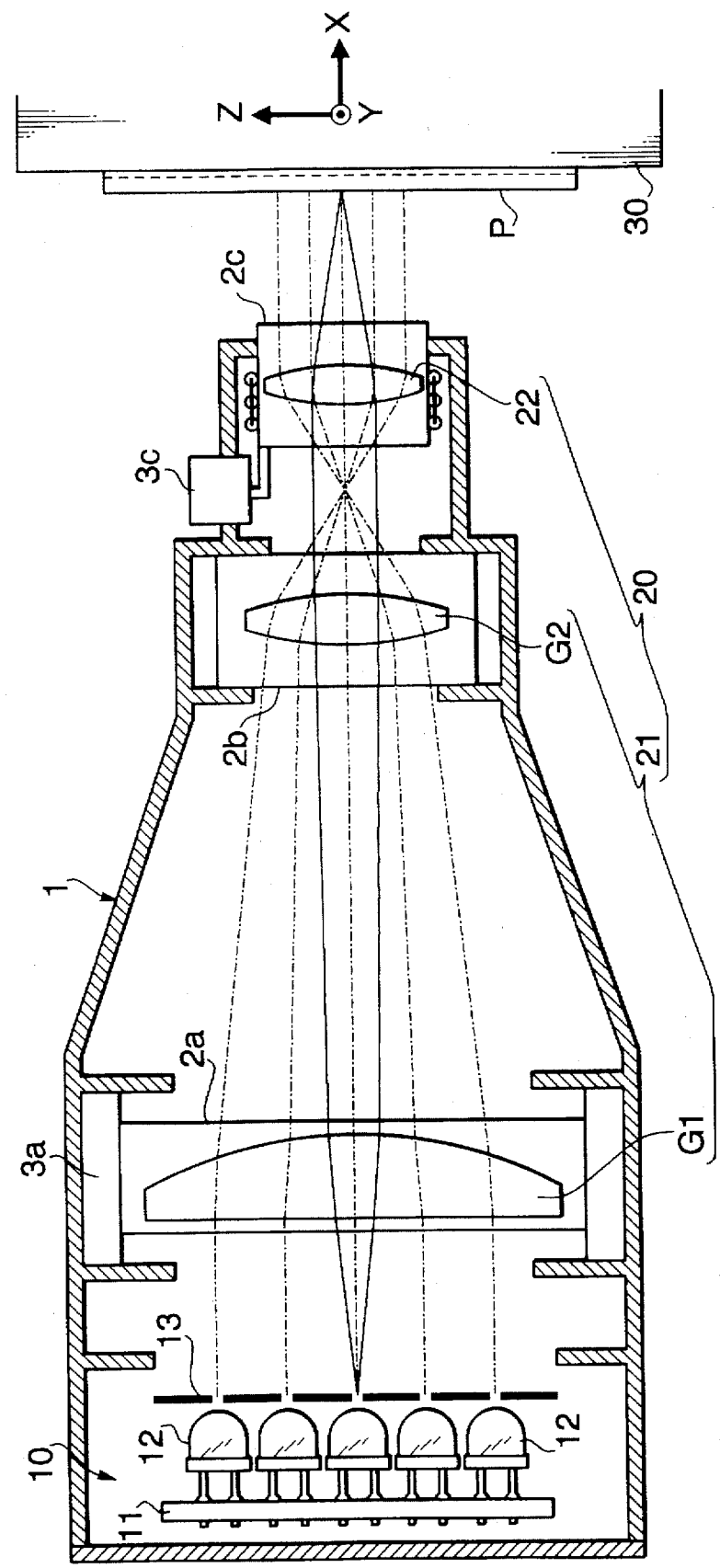
FIG. 4 is a schematic top view showing a third embodiment of a multibeam recording device according to the invention.
Figure 5:
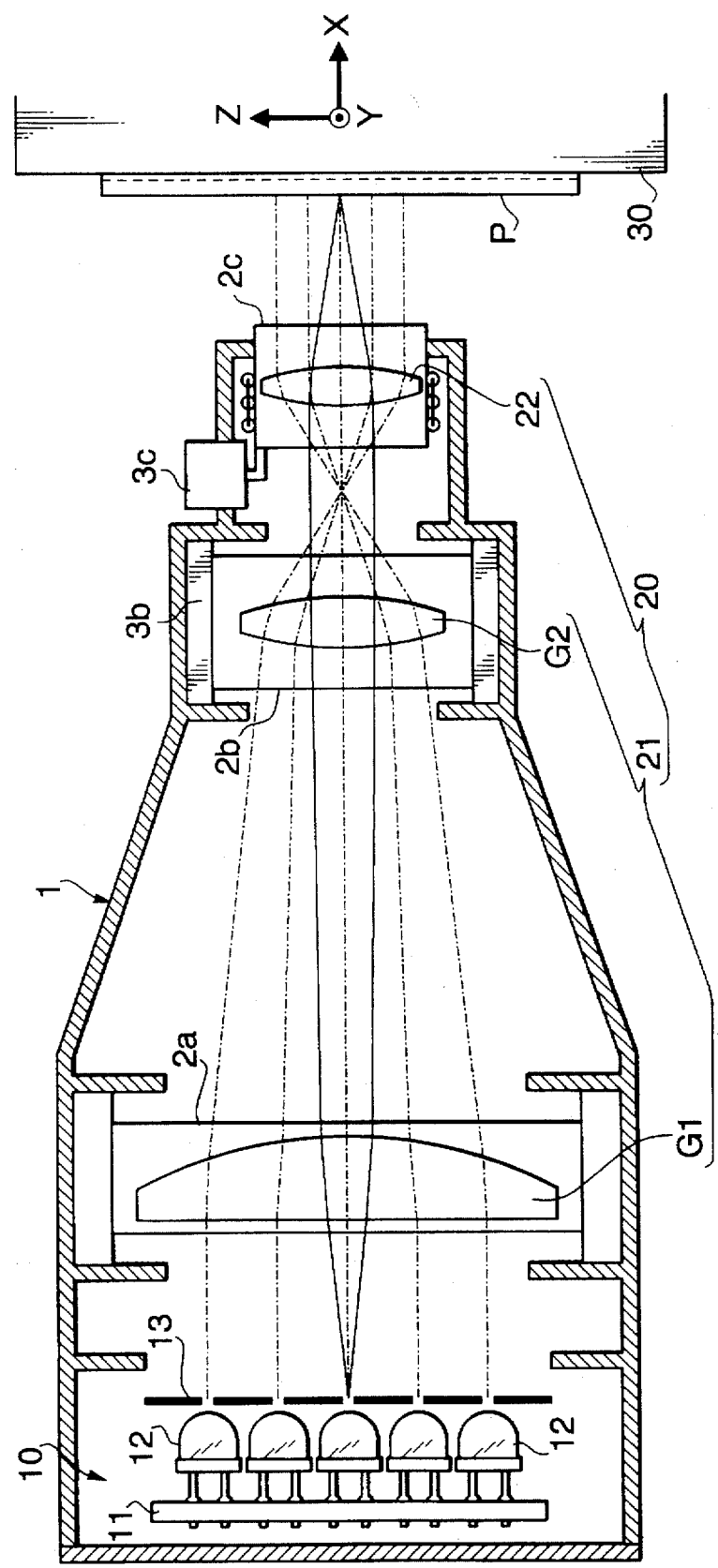
FIG. 5 is a schematic top view showing a variation of the third embodiment.

FIGS. 4 and 5 show a third embodiment of a multibeam recording device according to the invention. Portions of the third embodiment that are not described are identical to those of the first embodiment.

In the third embodiment, the emitter unit 10 and the reduction lens system 20 are arranged in a casing 1. The first lens group 21 of the reduction lens system 20 includes a condenser lens (element) G1 and an image side lens group G2. The second lens group 22 corresponds to that of the first and second embodiments. The lens groups G1, G2 and 22 are held by frames 2a, 2b and 2c, respectively.

The reduction lens system 20 is afocal an telecentric with respect to both of the emitter unit 10 and the photosensitive medium P. The beams from each LED 12 exiting the image side lens group G2 after passing through the first lens group 21 are collimated as in the first embodiment. However, the beams are not collimated between the condenser lens G1 and the image side lens group G2. In this construction, as the beams are collimated between the first lens group 21 and the second lens group 22, the magnification does not change when the distance between the lens groups 21 and 22 is changed. However, in the third embodiment, the distance between the lens groups G1 and G2 is changed in order to change the magnification of the area image pattern.

In order maintain acceptable spherical aberration, coma and other aberrations of the entire optical system when the magnification is adjusted, two conditions are satisfied: the aberration caused by the moving lens does not change; and the aberration of the image side with respect to the moving lens does not change even if the incident beams change. Further, since the beams exiting from the image side lens G2 of the first lens group 21 are collimated beams, even if part of the first lens group 21 moves in the direction of the optical axis (X axis), the aberration is only slightly varied.

As shown in FIG. 4, in the third embodiment, the condenser lens G1, held in the first lens frame 2a, is moved in the direction of the optical axis (X) by a magnification adjustment mechanism 3a having a micrometer, or alternatively having an actuator. The condenser lens G1 only slightly affects the compensation of the aberration because the height of the marginal ray incident thereto is low. Accordingly, even if the condenser lens G1 moves in the direction of the optical axis (X), the spherical aberration, coma, and other aberrations do not change significantly. In this example, the condenser lens G1 is moved in the direction of the optical axis X to allow magnification adjustment while suppressing variation in the aberration. Using this magnification adjustment, as previously described, even if the lenses have magnification error due to the inaccuracies in manufacturing or assembly, compensation can be made.

The third lens frame 2c, holding the second lens group 22, is moved in the direction of the optical axis (X) by a focusing mechanism 3c in accordance with a focusing point detection device (not shown) similar to that in the first embodiment, to allow the reducing projection optical system 20 to focus on the photosensitive medium P.

A variation of the third embodiment is shown in FIG. 5. In FIG. 5, the image side lens group G2, held in the second lens frame 2b, is moved in the direction of the optical axis (X) by a magnification adjustment mechanism 3b having a micrometer, or alternatively having an actuator.

Since the condenser lens G1 is of a large diameter in order to collect all of the light from the apertures 13A of the emitter unit, it is therefore relatively heavy and unwieldy. The load on the magnification adjusting mechanism 3b is greatly reduced by moving the image side lens group G2.

In the second and third embodiments, in a multibeam recording device according to the present invention, a two-dimensional pattern formed at a emitter unit 10 is projected through a reduction lens system 20 to a recording medium P at a predetermined magnification, and a portion (in these embodiments, lens groups 21 or 22) of a plurality of lens elements of the reduction lens system 20 is movable along the optical axis (X) for adjusting the magnification.

Figure 6:
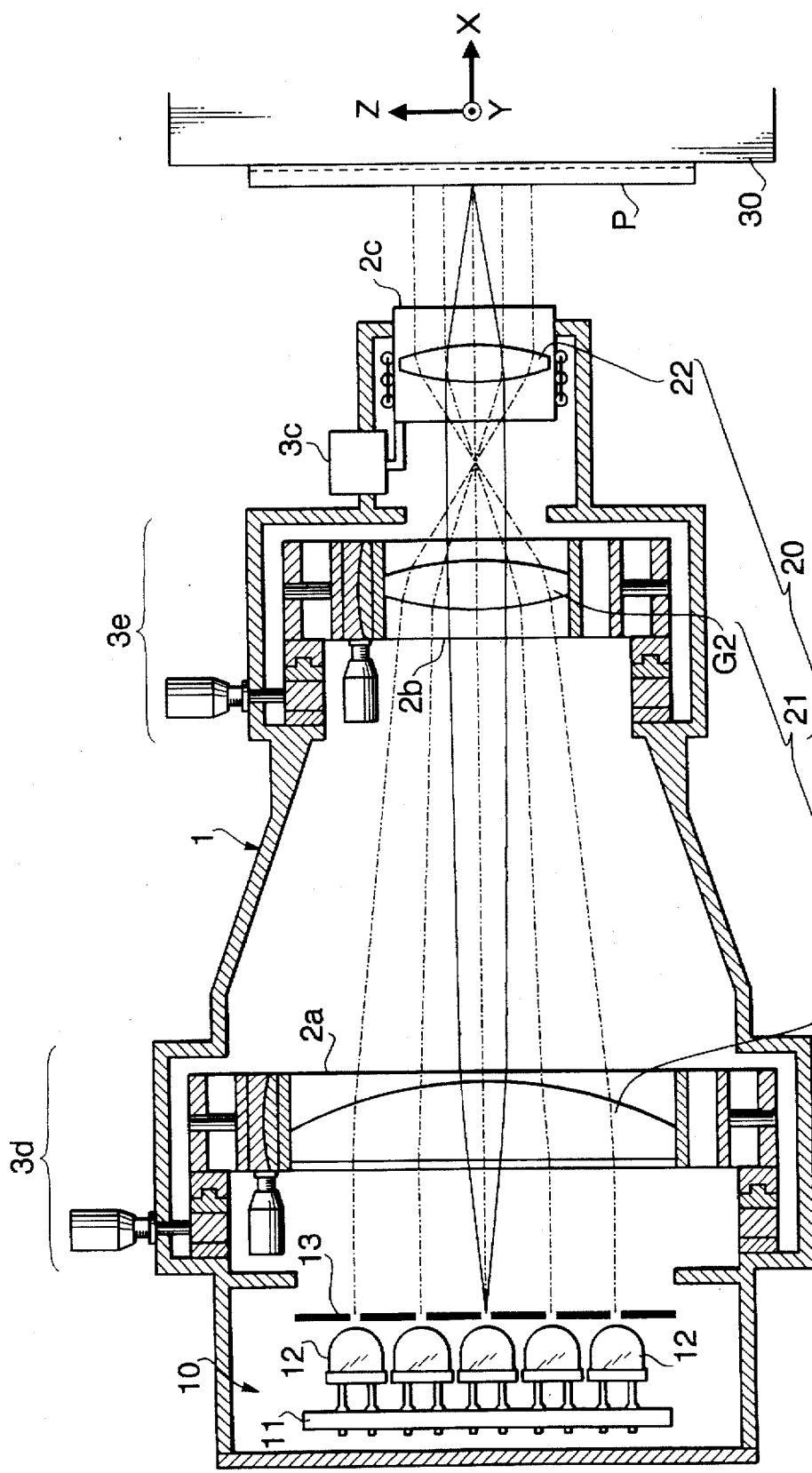
FIG. 6 is a schematic top view showing a fourth embodiment of a multibeam recording device according to the invention.

FIG. 6 shows a fourth embodiment of a multibeam recording device according to the invention. Portions of the fourth embodiment that are not described are identical to those of the first embodiment.

In the fourth embodiment, the reducing optical system 20 includes a first lens group 21 having a positive power as a whole. The first lens group 21 includes a condenser lens G1 and an image side lens group G2. A second lens group 22 also having a positive power is arranged on the image side with respect to the first lens group 21. The condenser lens G1, the image side lens group G2, and the second lens group 22 are respectively held in first, second and third lens frames 2a, 2b and 2c, assembled in a casing 1.

The first lens frame 2a, holding the condenser lens G1, is adjustable in the Z-Y plane, and rotatable about the Z and Y axes, to be centered and decentered by a decentering adjustment mechanism 3d. The second lens frame 2b, holding the image side lens group G2, is also adjustable in the Z-Y plane, and rotatable about the Z and Y axes, to be centered and decentered by an decentering adjustment mechanism 3e.

The decentering Adjusting mechanisms 3d and 3e are conventional mechanisms that allow movement along two axes within a plane, and tilting-about the two axes. In FIG. 6, an example of such a mechanism is shown for each of the decentering adjustment mechanisms 3d and 3e, as a gimbal supported by an "X-Y" table (although the movement is along the Z-Y axes in this case). The "X-Y" table has a large opening in the center to support-the gimbal, and the gimbal (having Z-axis and Y-axis frames) supports the respective lens group. Micrometers, or alternatively actuators, are provided to each of the z direction and Y direction sliders of the "X-Y" table, and to gonio-stage adjusters (i.e., an adjuster stage allowing angular adjustment or tilting, about a remote center axis) provided between the Z-axis gimbal frame and the "X-Y" table, and between the Z-axis gimbal frame and Y-axis gimbal frame. Any conventional arrangement allowing the appropriate freedom of movement and accurate adjustment will serve as the decentering adjustment mechanism 3d or 3e.

Accordingly, the decentering adjustment mechanisms 3d and 3e move the lens groups G1 and G2, respectively, in the Z direction and the Y within a plane normal to the optical axis (X), and rotate the lens groups G1 and G2 to tilt about the Z axis or Y axis. Decentering aberration in any direction can be canceled by allowing the two lens groups G1 and G2 to move in two different directions and to tilt about two different axes.

At least two lens elements must be made independently adjustable because decentering distortion due to assembling or manufacturing inaccuracies contains two distortion components that may not be completely canceled by adjusting only one lens element. Further details on the decentering distortion and correction can be found in "Third Order Aberration in the Optical System, Including Decentering Error" by Yoshiya Matsui, Shadan-Hojin Nihon Opto-Mechatronics Association, June 1990.

The third lens frame 2c, holding the second lens group 22, is moved in the direction of the optical axis (X) by a focusing mechanism 3c in accordance with a focusing point detection device (not shown) similar to that in the first embodiment, to allow the reducing projection optical system 20 to focus on the photosensitive medium P.

As described, by providing individually movable lens frames 2a and 2b, making the two lens groups G1 and G2 independently adjustable, the decentering aberration can be canceled. If the second lens group 22 were to be moved in the direction of the optical axis for focusing and used for canceling the decentering aberration, its moving mechanism would be overly complicated.

In the fourth embodiment, in a multibeam recording device according to the present invention, a two-dimensional pattern formed at a emitter unit 10 is projected through a reduction lens system 20 on a recording plane (recording medium P). The reduction lens system 20 includes a plurality of lens elements (in this -case, lenses in groups G1, G2, and 22), and at least two of the plurality of lens elements (in this case, lens groups G1 and G2) are respectively and independently adjustable to cancel decentering distortion.

The reducing optical system 20 in the fourth embodiment of a multibeam recording device according to the invention is constructed such that aberration is compensated within each lens group. Accordingly, even if the focusing mechanism 3c moves the second lens group 22 in the direction of the optical axis X, the characteristics of the optical system 20 as a whole are maintained. Since aberrations are compensated within each of the first lens group 21 and second lens groups 22, even if the condenser lens G1 and image side lens group G2 are independently adjusted to correct decentralizing distortion, coma is suppressed.

Hereinafter, three concrete lens examples, applicable in the four embodiments, are described. The following three examples may be applied to all embodiments, but since the second embodiment allows magnification changes by moving the second lens group 22 relative to the first lens group 21, the second embodiment demands a different focal length f and distance d0 between the emitter unit 10 and the first lens group 21 of the reduction lens system 20. In the context of this specification, the object side of a lens is the side toward the emitter unit 10, and the image side of a lens is the side toward the photosensitive medium P upon which the images of the apertures 13A are formed.

Figure 7:
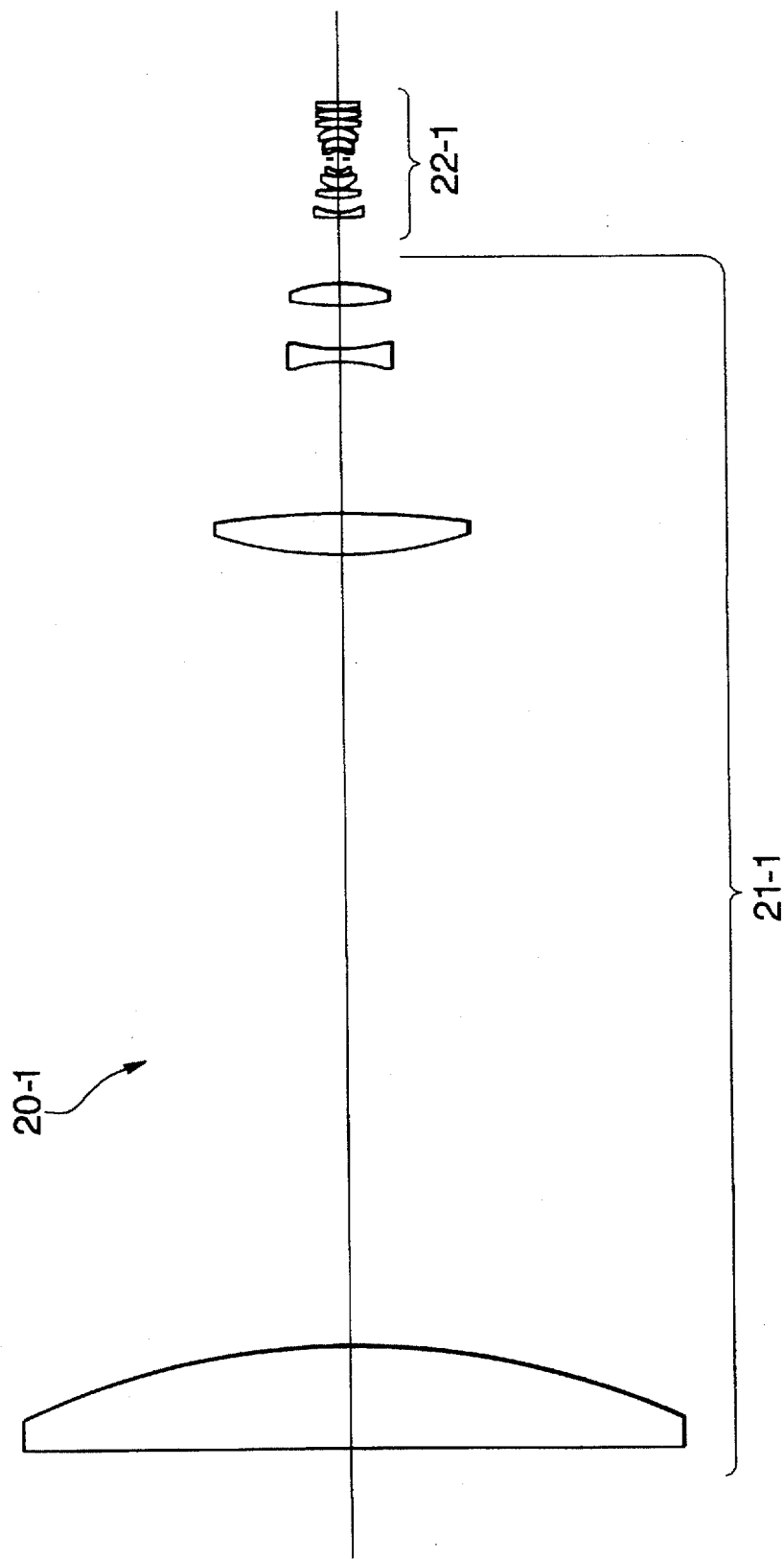
FIG. 7 is a lens configuration of a first example of a reduction lens system applicable to the embodiments.
Figure 8:
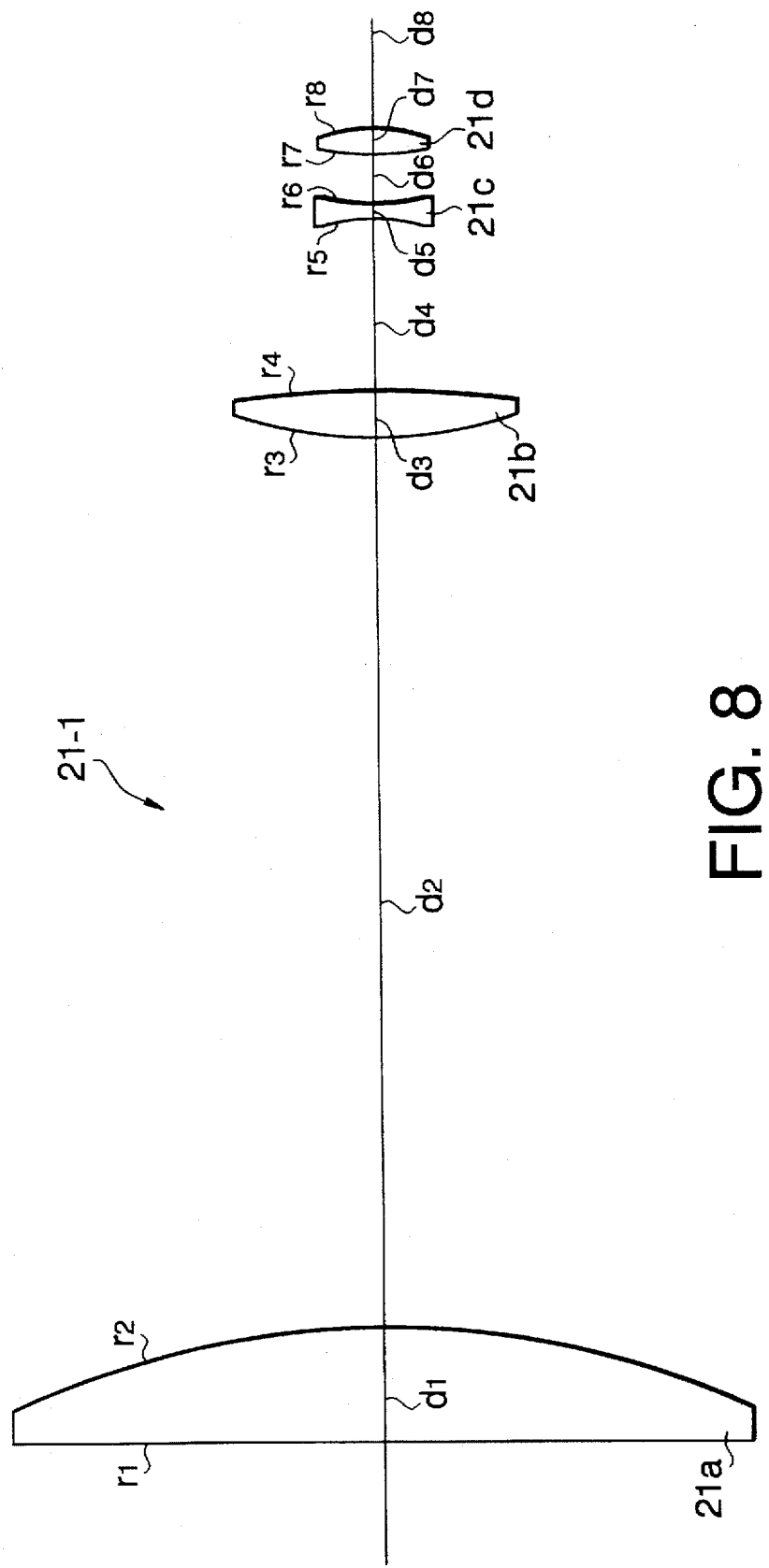
FIG. 8 is a lens configuration of a first lens group of the first example of a reduction lens system.
Figure 9:
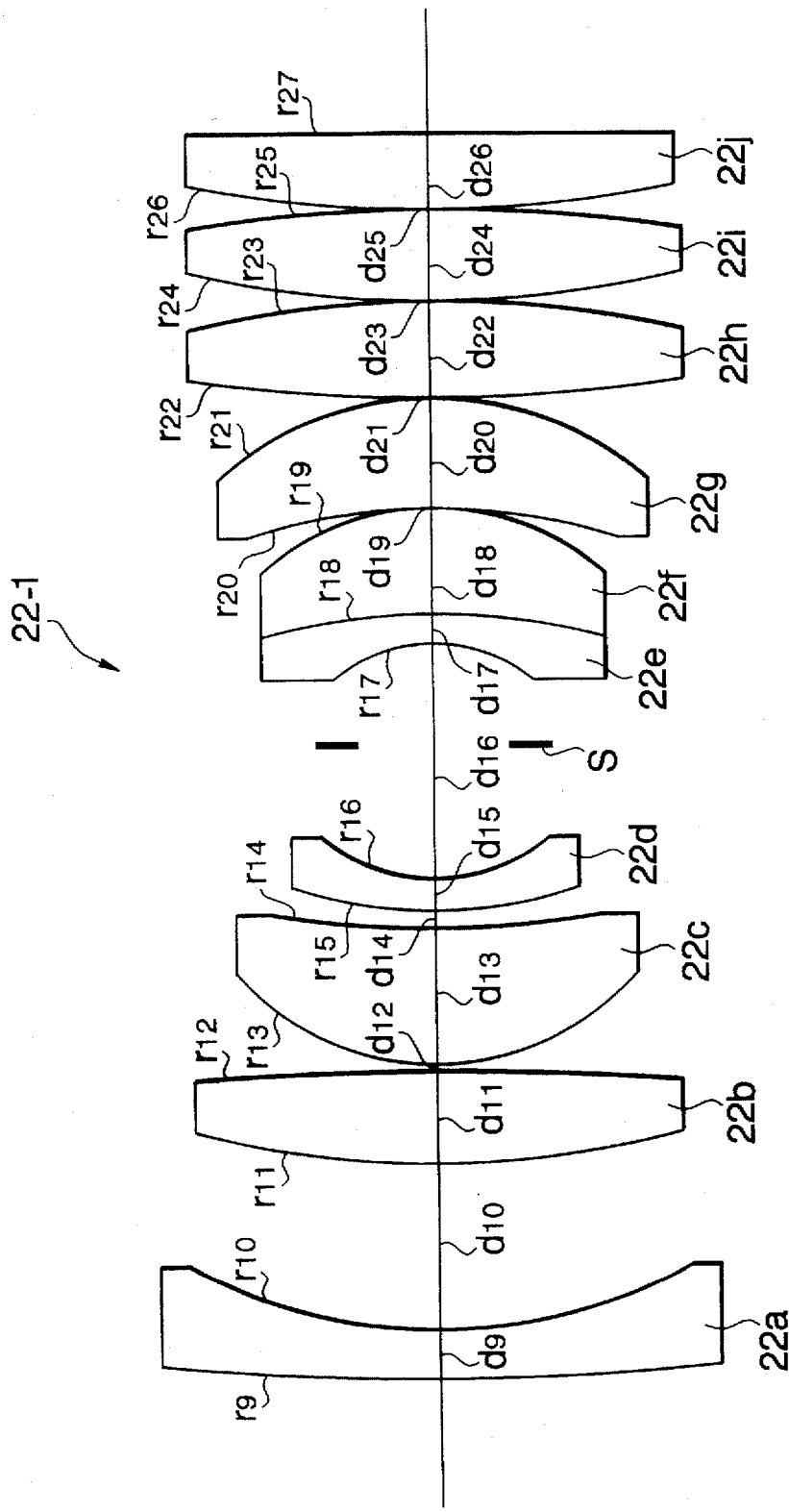
FIG. 9 is a lens configuration of a second lens group of the first example of a reduction lens system.

FIGS. 7, 8 and 9 are lens configurations of the first example of a reduction lens system 20-1. FIG. 7 shows the entire reduction lens system 20-1, FIG. 8 illustrates the first lens group 21-1 in detail, and FIG. 9 shows the second lens group 22-1 in detail. FIGS. 10A through 10E show various aberrations of the first example of a reduction lens system 20-1. FIG. 10A is an aberration chart, in mm, of spherical aberration SA and sine condition SC at a wavelength of 450 nm. FIG. 10B shows chromatic aberration expressed as spherical aberrations, in mm, at 400 nm, 450 nm, and 550 nm wavelengths. FIG. 10C shows lateral chromatic aberration, in mm, at 400 nm and 550 nm wavelength. FIG. 10D shows astigmatism, in mm (S: sagittal, M: meridional). FIG. 10E shows the distortion (in percent). Throughout this specification, the vertical axes of spherical aberration charts represent f-number, and the vertical axes of lateral chromatic aberration, astigmatism, and distortion represent image height..

In the first example of a reduction lens system 20-1, the first lens group 21-1 is constructed as four groups having four pieces and is indicated from the first surface r1 to the eighth surface r8 in FIG. 8 and in Table 1 below. The first lens group 21-1 consists of a positive first lens 21a, a positive second lens 21b, a negative third lens 21c and a positive fourth lens 21d in order from the emitter unit 10 side.

The second lens group 22-1 is constructed as nine groups having ten pieces and is indicated from the ninth surface r9 to the last and twenty-seventh surface r27 in FIG. 8 and in Table 1 below. The second lens group 22-1 consists of a negative first lens 22a, a positive second lens 22b, a positive third lens 22c, a negative fourth lens 22d, an aperture stop S. a negative fifth lens 22e and positive sixth through tenth lenses 22f, 22g, 22h, 22i and 22j in order from the object side. The fifth lens 22e and the sixth lens 22f are cemented to each other.

In order that the lens is telecentric on the emitter unit 10 side, the rear focal point of the first lens group 21-1 substantially coincides with the aperture stop S. In order that the lens is telecentric on the photosensitive medium P side, the front focal point of the second lens group 22-1 substantially coincides with the aperture stop S.

The lens defining numerical structure of the first example is shown in Table 1. In Table 1, r is the radius of the curvature (in mm, corresponding to surfaces rn in FIGS. 8 and 9 from r1 to r27), dn is the thickness of the lens or spatial distance between lenses (in mm, corresponding to dn notations in FIGS. 8 and 9 from d1 to d26), n-450 is the refractive index of the lens at 450 nm, and ν is the Abbe number of the glass.

For the first example as applied to the first, third and fourth embodiments, the focal length f is 138.46 mm, the F number FNo is 1:2.5, the distance d0 along the optical axis from the aperture plate 13 to the object side surface of the first lens group 21 is 17.25 mm, the back focus fB is 18.00 mm, and the magnification M is −0.040.

TABLE 1

| SURFACE | r | dn | n-450 | ν |
|---|---|---|---|---|
| r1 | ∞ | 47.00 | 1.52485 | 64.1 |
| r2 | −370.000 | 360.48 | | |
| r3 | 198.800 | 18.00 | 1.49480 | 70.2 |
| r4 | −533.000 | 69.40 | | |
| r5 | −73.562 | 5.00 | 1.63114 | 49.8 |
| r6 | 81.685 | 19.92 | | |
| r7 | 135.029 | 9.80 | 1.49480 | 70.2 |
| r8 | −65.656 | 35.30 | | |
| r9 | 93.720 | 2.00 | 1.50347 | 81.6 |
| r10 | 20.790 | 6.50 | | |
| r11 | 31.514 | 3.50 | 1.71354 | 31.1 |
| r12 | −2824.027 | 0.35 | | |
| r13 | 10.000 | 5.80 | 1.50347 | 81.6 |
| r14 | 35.190 | 0.70 | | |
| r15 | 20.874 | 1.20 | 1.66888 | 33.8 |
| r16 | 7.400 | 5.15 | | |
| Aperture S | | 4.09 | | |
| r17 | −5.748 | 1.20 | 1.66888 | 33.8 |
| r18 | −25.828 | 4.00 | 1.50347 | 81.6 |
| r19 | −9.200 | 0.25 | | |
| r20 | −24.120 | 4.00 | 1.50347 | 81.6 |
| r21 | −12.800 | 0.20 | | |
| r22 | 59.800 | 3.50 | 1.50347 | 81.6 |
| r23 | −49.400 | 0.10 | | |
| r24 | 40.040 | 3.50 | 1.50347 | 81.6 |
| r25 | −131.719 | 0.10 | | |
| r26 | 50.000 | 3.00 | 1.50347 | 81.6 |
| r27 | ∞ | | | |

In the first lens example, the first lens 22a, the third lens 22c and the sixth through tenth lens 22f, 22g, 22h, 22i and 22j of the second lens group 22 is made from positive anomalous dispersion glass. The two negative lenses between which the aperture stop s is located (the fourth lens 22d and fifth lens 22e of the second lens group 22) are made from high dispersion glass.

In the first example of a reduction lens system 20-1 a according to the present invention (as well as in the second and third examples 20-2 and 20-3), a positive first lens group 21-1 and a positive second lens group 22-1 (being 22-2 and 22-3 for the second and third examples, respectively), are provided in order from, the object side, an aperture S is located inside the second lens group 22-1 (being 22-2,and 22-3 for the second and third examples respectively), and at least one positive lens made from an anomalous dispersion glass is provided on the image side of the aperture S. The anomalous dispersion glass satisfies the following conditions:

$$\nu > 70 \quad (1);$$

and $$\Delta\theta ig > 0.10 \quad (2),$$

where ν is the Abbe number, and Δθig is a value representing anomalous dispersion between the i spectral line (365 nm wavelength) and the g spectral line (436 nm wavelength). The anomalous dispersion Δθig can be expressed as Δθig= θig−θ'ig, where θig represents a partial dispersion ratio of the anomalous dispersion glass from the i line to g line, and θ'ig indicates a predetermined point on a straight line connecting the coordinates of optical glasses K7 and F2 on a correlation chart of the partial dispersion ratio θig versus ν. θig and θ'ig can be expressed as follows:

$$\theta ig = (ni - ng)/(nF - nC) \quad (3);$$

and $$\theta'ig = -8.374 \times 10^{-3}\nu + 1.725 \quad (4),$$

where refractive indexes at i, g, F (486 nm wavelength) and, C (656=nm wavelength) spectral lines are ni, ng, nF and nC, respectively.

For the anomalous dispersion glass used in the embodiments (the same value for each of the first, second and third example reduction lens systems 20-1, 20-2, and 20-3), the partial dispersion ratio θig is 1.188, a partial dispersion ratio of a predetermined point θ'ig on the straight line linking the points indicating K7 optical glass and F2 optical glass (in the correlation coordinate between partial dispersion ratio Δθig and the Abbe number ν) is 1.042. Lastly, the anomalous dispersion Δθig is 0.146.

For normal optical glass, when a correlation is investigated taking the partial dispersion ratio θig as a vertical axis and the Abbe number ν as a horizontal axis, data points concentrate about the line (θ'ig being on the line) which connects two types of optical glass K7 and F2. Some glasses are away from the line connecting K7 and F2, and these glasses are known as anomalous dispersion glasses. In the context of this specification, an anomalous dispersion glass which has a coordinate above the line connecting K7 and F2 is defined as a positive anomalous dispersion glass.

Generally, in order to suppress lateral chromatic aberration, it is preferable to use a glass that has low dispersion (i.e., having large Abbe number ν). Especially, for a lens which refracts beams a large distance away from the optical axis, using a lens having low dispersion suppresses lateral chromatic aberration by the lens itself. According to each of the example reduction lens systems 20-1, 20-2, and 20-3 applicable to the first through fourth embodiments, it is preferable to use low dispersion glass for the lenses arranged on the object side with respect to the aperture stop S.

In balancing the longitudinal chromatic aberration and the lateral chromatic aberration with this method- for beams having wavelengths between 400 nm to 550 nm, normal optical glass cannot sufficiently compensate for chromatic aberration (in particular the lateral chromatic aberration) due to the secondary spectrum. In the embodiments of the invention, in order to compensate for chromatic aberration due to the secondary spectrum, positive anomalous dispersion glass is used. The positive anomalous dispersion glass has greater dispersion for shorter wavelengths (for example, 365 to 436 nm).

The use of positive anomalous dispersion glass having low dispersion that satisfies the first condition (ν>70) for the positive lenses sufficiently compensates for chromatic aberration due to the secondary spectrum. Furthermore, the use of positive anomalous dispersion glass for negative lenses arranged on the light source side of the aperture sufficiently compensates: for lateral chromatic aberration.

The second condition (Δθig>0.10) defines the characteristics of the anomalous dispersion. If the second condition is not satisfied, the anomalous dispersion characteristic is too small and the chromatic aberration due to the secondary spectrum can not be sufficiently compensated.

Generally, anomalous dispersion glass having low dispersion has high transparency for light having shorter wavelengths. Therefore, the use of such glass also improves the transparency of the entire optical system.

Since the marginal ray passes away from the optical axis through the lenses arranged close to the aperture, in order to compensate for longitudinal chromatic aberration, it is preferable that negative lenses close to the aperture (in this case, the fourth lens 22d and fifth lens 22e of the second lens group 22) are made from glass having greater dispersion than the glass for the positive lenses.

It is further preferable that positive lenses closer to the aperture be made from positive anomalous dispersion glass having relatively low dispersion. It is also preferable that the positive lens arranged adjacent to the image forming plane is made from positive anomalous dispersion glass in order to suppress the lateral chromatic aberration. Accordingly, on the object side with respect to the aperture, the positive lens closest to the aperture (in this case, the third lens 22c of the second lens group 22-1) and the positive lens closest to the image forming plane (in this case, the sixth through tenth lenses 22f through 22j of the second lens group 22-1) are preferably made from positive anomalous dispersion glass as described.

FIG. 11 is a chart showing spherical aberration, for wavelengths of 400 nm, 450 nm, and 550 nm, of the first lens group 21-1 of the first example reduction lens system 20-1 applied in at least the first embodiment; and FIGS. 12A through 12D are charts showing transverse aberration of the first lens group 21-1 of the first example reduction lens system 20-1 applied in at least the first embodiment. FIG. 13 is a chart showing spherical aberration of the second lens group 22-1 of the first example reduction lens system 20-1 applied in at least the first embodiment; and FIGS. 14A through 14D are charts showing transverse aberration of the second lens group 22-1 of the first example reduction lens system 20-1 applied in at least the first embodiment. As shown in FIGS. 11, 12A through 12D, 13, and 14A through 14D, as described with respect to the first embodiment, the aberrations are corrected independently in the respective lens groups 21-1 and 22-1. Therefore, the aberrations undergo only slight deterioration when the second lens group 22 (in this case, second lens group 22-1 of the first example of a reduction lens system 20-1) of the first embodiment, is moved for focusing.

For the first example of a reduction lens system 20-1 as applied to the second embodiment, the focal length f is 138.46 mm, the F number FNo Is 1:2.5, the distance d0 along the optical axis from the aperture plate 13 to the object side surface of the first lens group 21 is 100 mm, the back focus fB is 17.87 mm, and the magnification M is −0.039. All other dimensions are as given in Table 1.

Figures 16A, 16B, 16C:
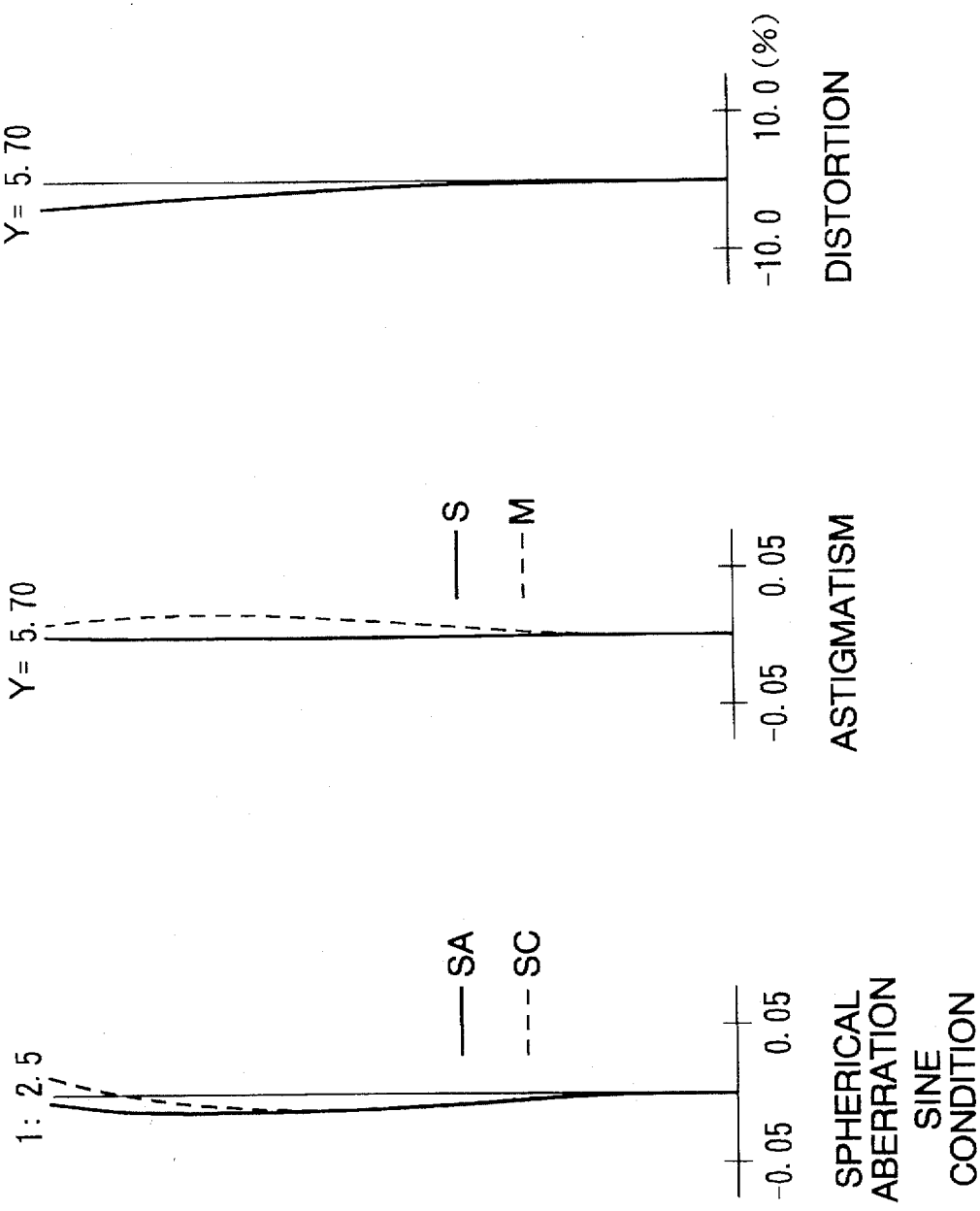
FIGS. 16A through 16C are charts similar to FIGS. 15A through 15C, respectively, showing a result when a second lens group is moved in a first direction.
Figure 19A:
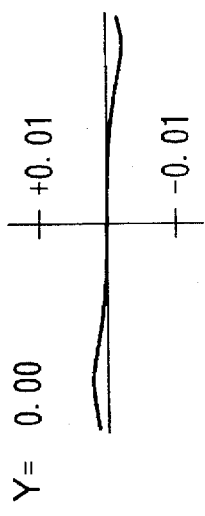
FIGS. 19A through 19D are charts showing transverse aberration of the first example of a reduction lens system as applied to the third embodiment.
Figure 19B:
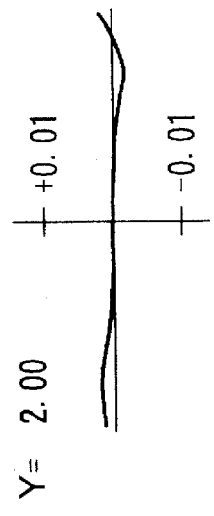
Figure 19C:
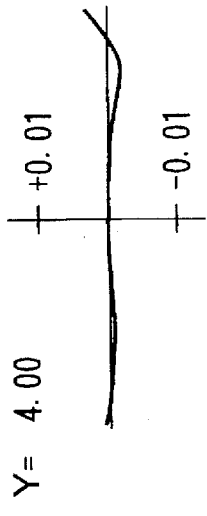
Figure 19D:
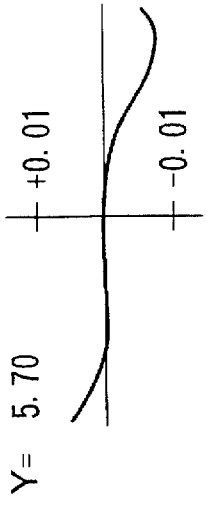

When the first lens example is applied to the second embodiment, if the second lens group 22-1 is slightly moved, the telecentric condition is lost, and the image magnification varies. FIGS. 15A through 15C are charts showing, respectively, spherical aberration, astigmatism and distortion of the first example of a reduction lens system 20-1 as applied to the second embodiment in the normal condition. When the second lens group 22-1 moves to the photosensitive medium P side by 7 mm (i.e., d8 becomes 42.30 mm), the aberrations are changed as shown in FIGS. 16A through 16C. When the second lens group 22-1 moves to the emitter unit 10 side by 7 mm (i.e., d8 becomes 28.30), the aberrations are changed as shown in FIG. 17A through 17C. As shown in FIGS. 16 and 17, even though the second lens group 22-1 of the first example of a reduction lens system 20-1 is moved to adjust the magnification, almost no deterioration in the aberration appears as a result of the movement.

Figure 18:
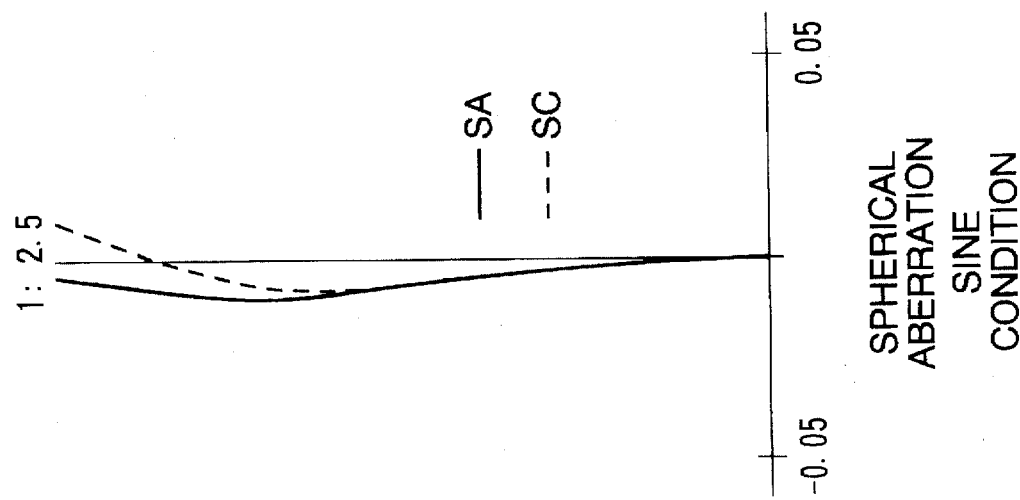
FIG. 18 is a chart showing spherical aberration of the first example of a reduction lens system as applied to the third embodiment.
Figure 23A:
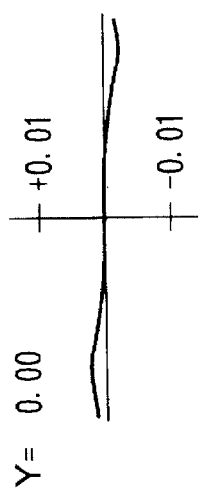
FIGS. 23A through 23D are charts similar to FIGS. 19A through 19D, respectively, showing the result of a movement of a condenser lens in a second direction.
Figure 23B:
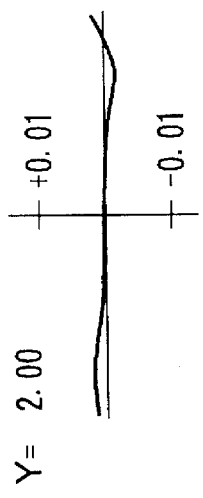
Figure 23C:
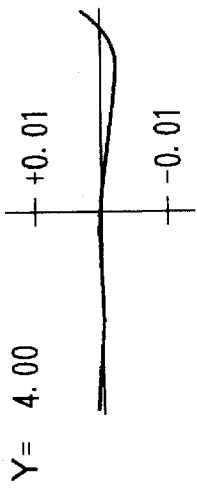
Figure 23D:
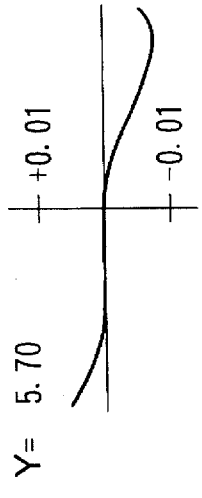

FIG. 18 is a chart showing spherical aberration of the first example of a reduction lens system 20-1 as applied to the third embodiment in a normal condition; and FIGS. 19A through 19D are charts showing transverse aberration at 450 nm wavelength of the first example of a reduction lens system 20-1 as applied to the third embodiment in the normal condition. Table 2 shows the variation of the magnification M and the ratios thereof when the condenser lens G1 (corresponding to the first lens 21a of the first example of a first lens group 21-1) is moved along the optical axis according to the construction of FIG. 4 of the third embodiment. Movement toward the photosensitive medium P side is labeled as "+" and to the emitter unit 10 side as "−".

TABLE 2

| G1 MOVES | d0 | d2 | M | RATIO |
| --- | --- | --- | --- | --- |
| +10 mm | 27.25 | 350.48 | −0.0405 | +1.25% |
| 0 mm | 17.25 | 360.48 | −0.0400 | 0.00% |
| −10 mm | 7.25 | 370.48 | −0.0395 | −1.25% |

Figure 22:
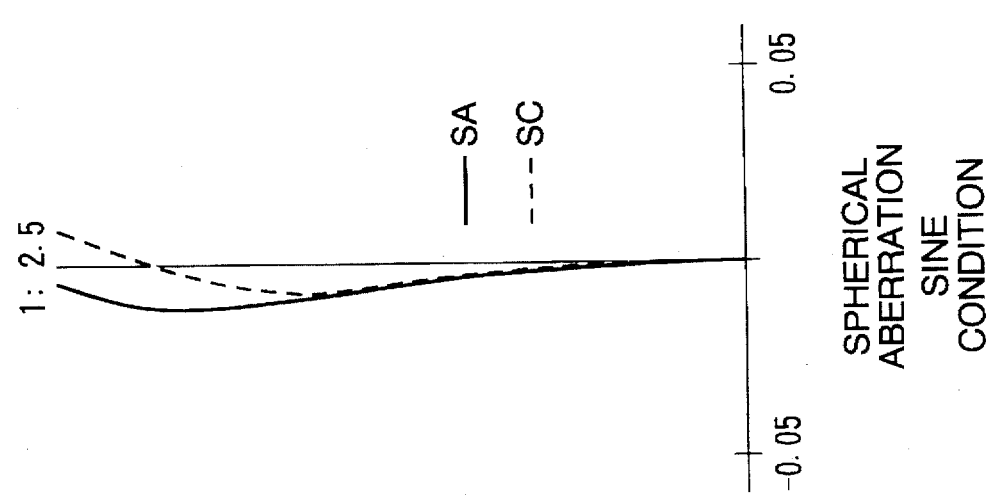
FIG. 22 is a chart similar to FIG. 18, showing the result of a movement of a condenser lens in a second direction.
Figure 25A:
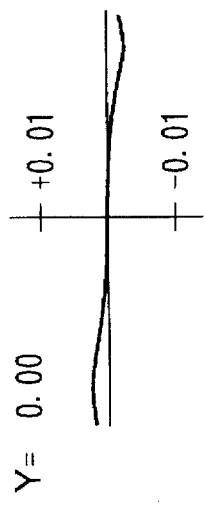
FIGS. 25A through 25D are charts similar to FIGS. 19A through 19D, respectively, showing the result of a movement of an image side lens group in a first direction.
Figure 25B:
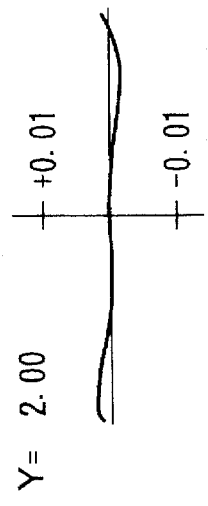
Figure 25C:
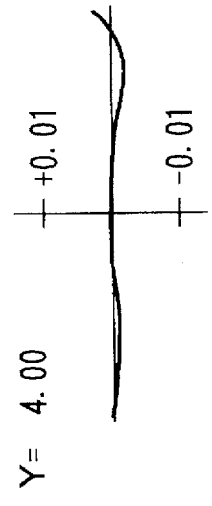
Figure 25D:
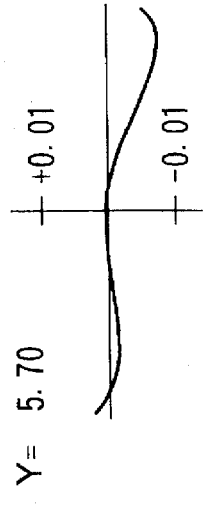

FIG. 20 is a chart similar to FIG. 18, showing the result of the condenser lens G1 moving by +10 mm; and FIGS. 21A through 21D are charts similar to FIGS. 19A through 19D, respectively, showing the result of the condenser lens G1 moving by +10 mm. FIG. 22 is a chart similar to FIG. 18, showing the result of the condenser lens G1 moving by −10 mm; and FIGS. 23A through 23D are charts similar to FIGS. 19A through 19D, respectively, showing the result of the condenser lens G1 moving by −10 mm.

Table 3 shows the variation of the magnification M and the ratios thereof when the image side lens group. G2 (corresponding to- lenses 21b, 21c, and 21d of the first example of a first lens group 21-1) moves along the optical axis according to the construction of FIG. 5 of the variation of the third embodiment.

TABLE 3

| G2 MOVES | d2 | d8 | M | RATIO |
| --- | --- | --- | --- | --- |
| +10 mm | 370.48 | 25.30 | −0.0394 | −1.50% |
| 0 mm | 360.48 | 35.30 | −0.0400 | 0.00% |
| −10 mm | 360.48 | 45.30 | −0.0406 | +1.50% |

Figure 24:
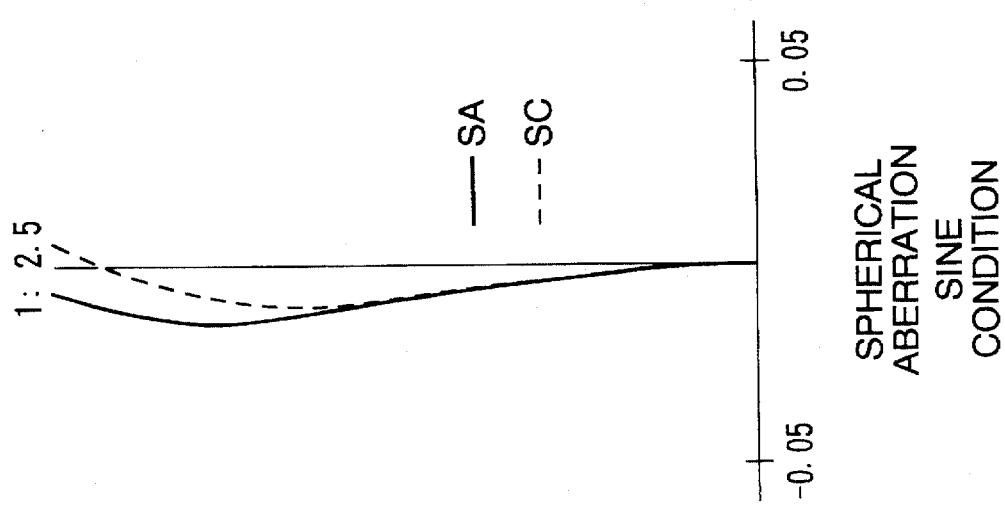
FIG. 24 is a chart similar to FIG. 18, showing the result of a movement of an image side lens group in a first direction.
Figure 27A:
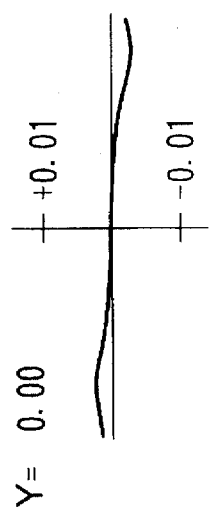
FIGS. 27A through 27D are charts similar to FIGS. 19A through 19D, respectively, showing the result of a movement of an image side lens group in a second direction.
Figure 27B:
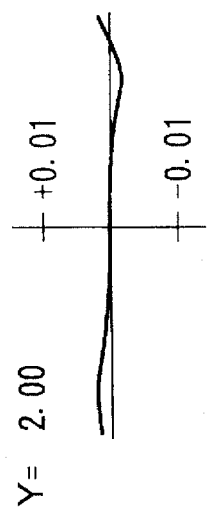
Figure 27C:
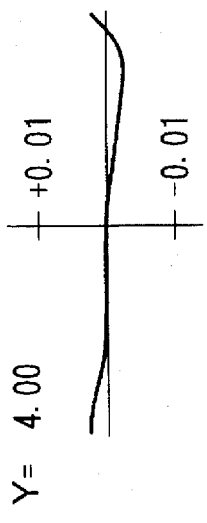
Figure 27D:
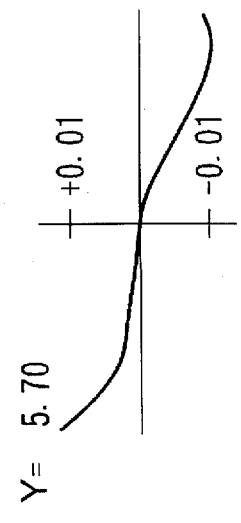
Figure 26:
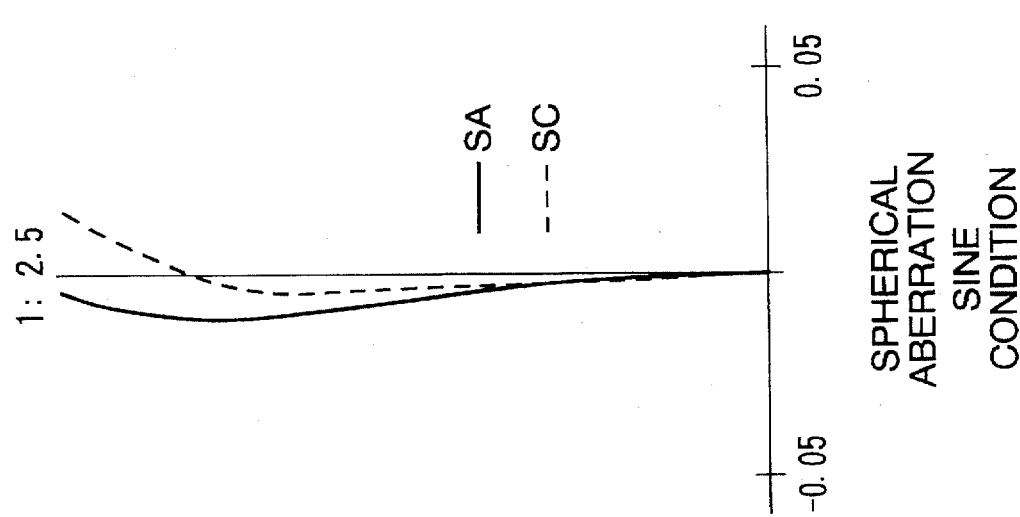
FIG. 26 is a chart similar to FIG. 18, showing the result of a movement of an image side lens group in a second direction.

FIG. 24 is a chart similar to FIG. 18, showing the result of the image side lens group G2 moving by +10 mm; and FIGS. 25A through 25D are charts similar to FIGS. 19A through 19D, respectively, showing the result of the image side lens group G2 moving by +10 mm. FIG. 26 is a chart similar to FIG. 18, showing the result of the image side lens group G2 moving by −10 mm; and FIGS. 27A through 27D are charts similar to FIGS. 19A through 19D, respectively, showing the result of the image side lens group G2 moving by −10 mm.

As shown, for the first example of a reduction lens system 20-1, using either the structure of the third embodiment (shown in FIG. 4) or the structure of the modification thereof (shown in FIG. 5) in either direction of magnification change, the change in aberrations are low, and adjustment of the magnification may be made without deterioration of the lens characteristics.

Table 4 shows an example of decentering adjustment performed with the first example of a reduction lens system 20-1 as applied to the fourth embodiment, for correcting decentering errors using the condenser lens G1 and the image side lens group G2.

Figure 28:
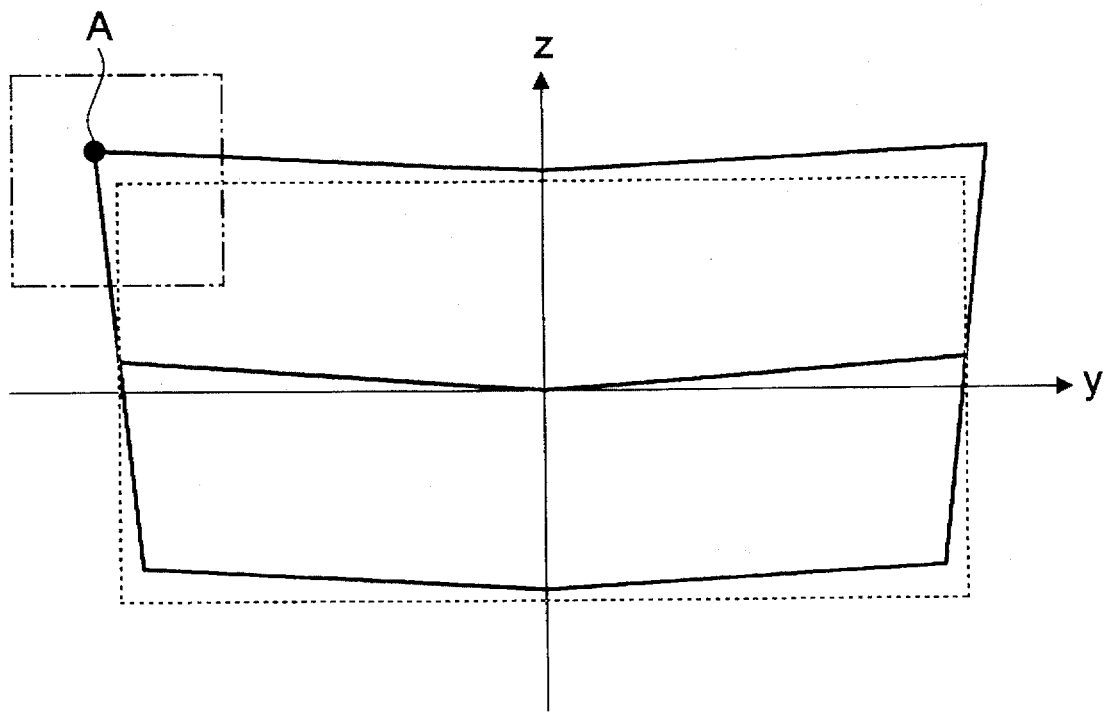
FIG. 28 is a schematic view showing decentering distortion expressed as a displacement amount.

The decentering distortion has a greater effect as the distance from the optical axis (X axis) increases. As shown in FIG. 28, the decentering distortion is expressed as a displacement amount between the actual focusing point and the ideal focusing point at a reference point A, point A being one of the points most distant from the optical axis within the rectangular image forming area (in this example, without any distortion, reference point A is at y=−5.12 mm, z=2.48 mm). When the displacement amount at the reference point A (i.e., the error at the reference point) decreases, the errors at other points also decrease. The corrected focusing area corresponds to the rectangular area indicated b the broken lines.

Figure 29:
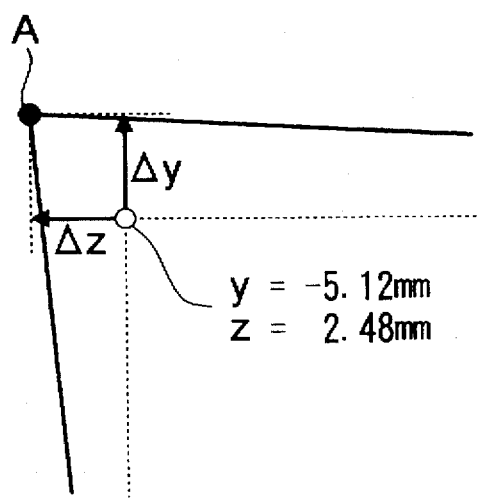
FIG. 29 is an enlarged view of an area defined by double-dotted lines in FIG. 28.

FIG. 29 is an enlarged view of the area defined by double-dotted lines in FIG. 28. As shown in FIG. 29, errors due to decentering distortion are illustrated as a projection of the distance from the ideal focusing point to the actual focusing point A (relative to the axes Y and Z, i.e., $\Delta y$ and $\Delta z$).

When decentering distortion occurs, the image is distorted in shape, and shifted in position. Therefore, the coordinate of the reference point A is affected by both the distortion in shape and the shift in position. In the application of the first example of a reduction lens system 20-1 to the fourth embodiment, only the displacement due to the distortion is taken into account, and the position of point A is indicated as the distance to point A from a standard image point corresponding to the object point on the axis. In other words, the position of point A is indicated as the coordinate of point A when the standard image point is returned to the origin of the coordinate.

components are generated from gradations of magnification along the Z axis, and V-shaped distortion components are distributed symmetrically with respect to the Z axis. In such a case, the direction of the compensation is along the Z axis parallel to the Z-Y plane, and tilted about the Y axis.

Specifically, the error amount is the same as the aberration amount when the image side lens G2 of the first lens group 21-1 is tilted about the Y axis by five minutes in Case (1); when the second lens group 22-1 is tilted about the Y axis by five minutes in Cases (2) and (4); and the image side lens group G2 is moved along the Z axis parallel to the Z-Y plane by 0.05 mm in Case (3).

As shown in Table 4, compensation for decentering distortion can be performed to correct decentering distortion in any direction according to the first example of a reduction lens system 20-1 as applied in the fourth embodiment by adjusting the two lens groups G1 and G2 to move parallel to the Z-Y plane or tilt about one of the Z or Y axes.

Figure 30:
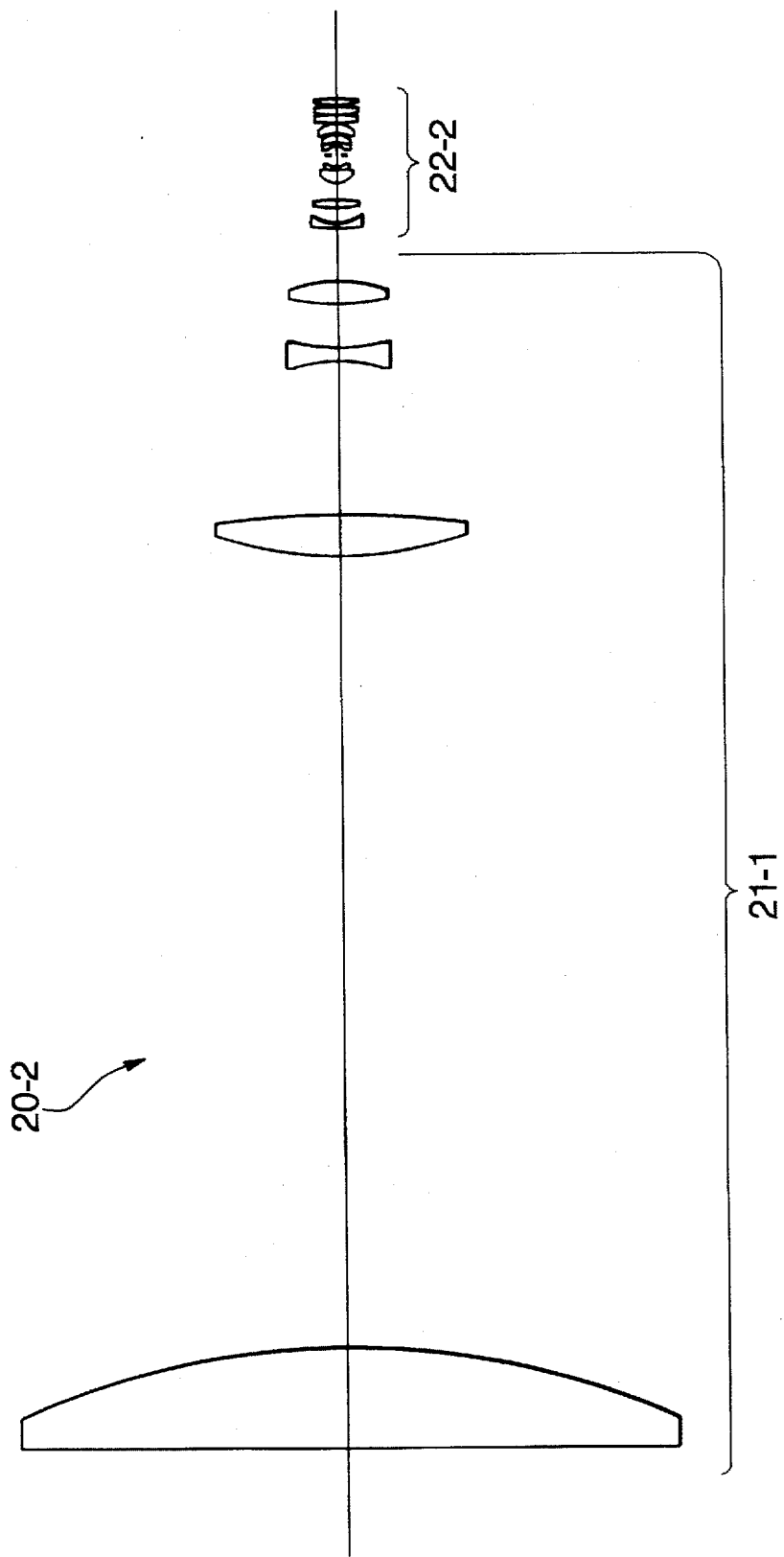
FIGS. 30 is a lens configuration of a second example of a reduction lens system applicable to the embodiments.
Figure 31:
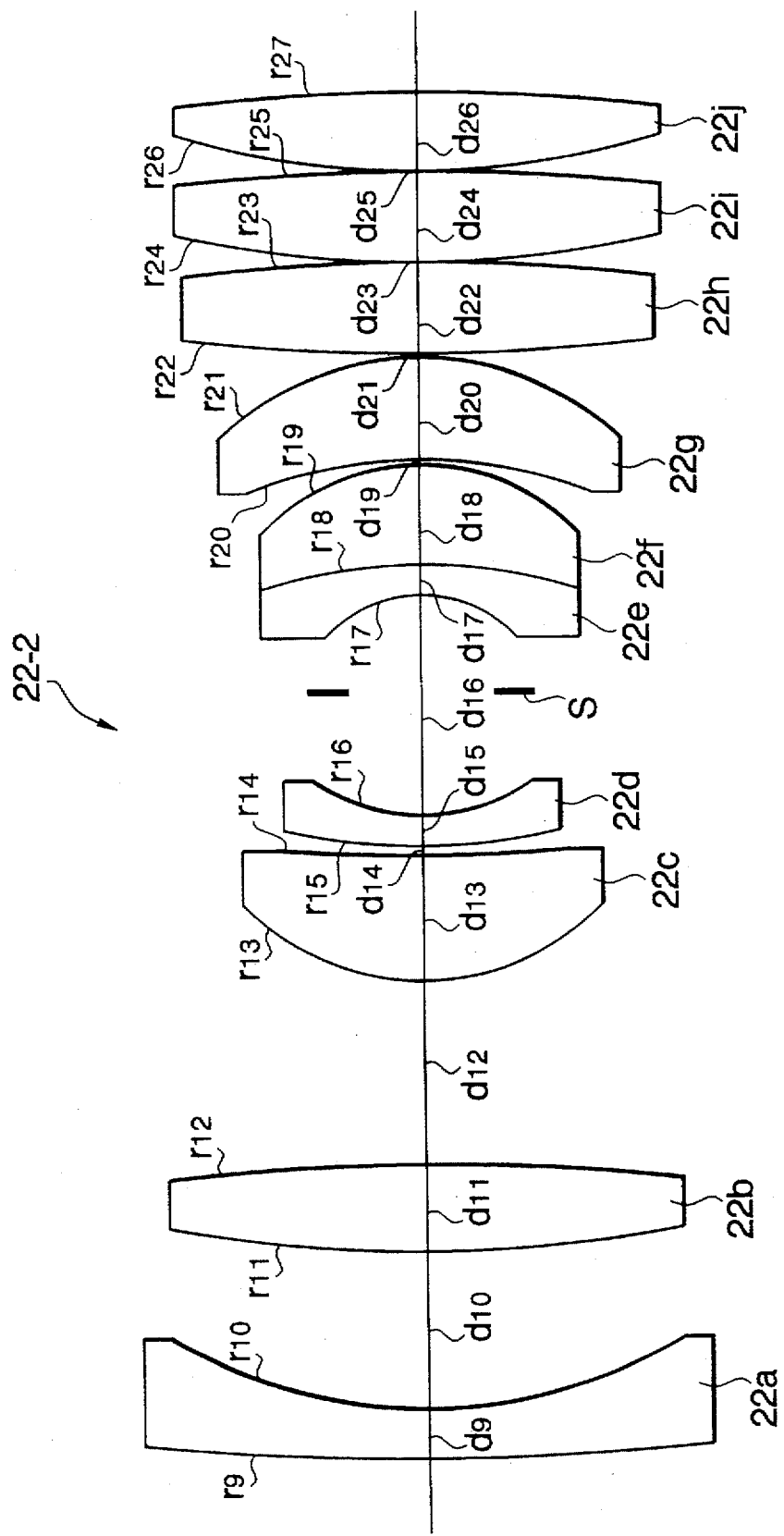
FIG. 31 is a lens configuration of a second lens group of the second example of a reduction lens system.

FIG. 30 is a lens configuration of a second example of a reduction lens system 20-2 applicable to the embodiments; and FIG. 31 is a lens configuration of a second lens group 22-2 of the second example of a reduction lens system 20-2.

TABLE 4

| CASE | DIR | BEFORE ADJUST | G1 ADJUST | G1 EFFECT | G2 ADJUST | G2 EFFECT | AFTER ADJUST |
| --- | --- | --- | --- | --- | --- | --- | --- |
| (1) | $\Delta y$ | −0.19 μm | 0.30 mm | 0.45 μm | −0.36 mm | −0.27 μm | −0.01 μm |
|     | $\Delta z$ | −0.06 μm |         | −0.55 μm |          | 0.65 μm  | 0.04 μm  |
| (2) | $\Delta y$ | 0.29 μm  | −0.85 mm | −1.28 μm | 1.25 mm  | 0.95 μm  | −0.04 μm |
|     | $\Delta z$ | 0.65 μm  |         | 1.56 μm  |          | −2.25 μm | −0.04 μm |
| (3) | $\Delta y$ | 0.38 μm  | −0.40 mm | −0.60 μm | −0.6 min | 0.23 μm  | 0.01 μm  |
|     | $\Delta z$ | −0.90 μm |         | 0.74 μm  |          | 0.07 μm  | −0.09 μm |
| (4) | $\Delta y$ | 0.29 μm  | 0.20 mm  | 0.30 μm  | 15.5 min | −0.59 μm | 0.00 μm  |
|     | $\Delta z$ | 0.65 μm  | )       | −0.37 μm |          | −2.25 μm | 0.09 μm  |

From left to right in Table 4, the columns represent: Cases (1) through (4) in each of the Y and Z directions, a decentering error amount before adjustment (BEFORE ADJUST), a compensation amount for the condenser lens G1 (G1 ADJUST), the effect of the adjustment of the condenser lens G1 shown as a change in decentering error (G1 EFFECT), a compensation amount for the image side lens group G2 (G2 ADJUST), the effect of the adjustment of the image side lens group G2 shown as a change in decentering error (G2 EFFECT), and the resulting decentering errors after compensation adjustment of both the condenser lens G1 and the image side lens group G2 is made (AFTER ADJUST). Adjustments in mm are shifts parallel to the Z-Y plane, and adjustments in min are amounts of tilt. In Cases (1) and (2), 01 and G2 are moved parallel to the Z-Y plane in Z and Y directions. In Cases (3) and (4), G1 is moved parallel to the Z-Y plane in Z and Y directions, and G2 is tilted about the Y axis in order to cancel the decentering distortion.

For example, in Case (1), due to decentering distortion, the position of the reference point A shifts by −0.19 μm in the Y direction, and −0.06 μm in the Z direction. By moving the condenser lens G1 in the Y axis direction by 0.30 mm, parallel to the Z-Y plane, and moving the image side lens group G2 in the Y axis direction by −0.36 mm, parallel to the Z-Y plane, the displacement of the point A with respect to its ideal position is decreased to −0.01 μm in the Y direction,, and 0.04 μm in the z direction.

In the example of Table 4, considered is a situation where the decentering distortion affects the image symmetrically with respect to the Z axis. That is, trapezoidal distortion FIG. 30 shows the entire reduction lens system 20-2, and FIG. 31 shows the second lens group 22-2 in detail. The construction of the first lens group.21-1 is identical to that in the first example 20-1 and as previously described. FIGS. 32A through 32E show various aberrations of the second example of -a reduction lens system 20-2. FIG. 32A is an aberration chart, in mm, of spherical aberration SA and sine condition SC at a wavelength of 450 nm. FIG. 32B shows chromatic aberration expressed as spherical aberrations, in mm, at 400 nm, 450 nm, and 550 nm wavelengths. FIG. 32C shows lateral chromatic aberration, in mm, at 400 nm and 550 nm wavelength. FIG. 32D shows astigmatism, in mm (S: sagittal, M: meridional). FIG. 32B shows the distortion (in percent).

The second lens group 22-2 is constructed as nine groups having ten pieces and is indicated from the ninth surface r9 to the last and twenty-seventh surface r27 in FIG. 31 and in Table 5 below. The second lens group 22-2 consists of a negative first lens 22a, a positive second lens 22b, a positive third lens 22c, a negative fourth lens 22d, an aperture stop S. a negative fifth lens 22e and positive sixth through tenth lenses 22f, 22g, 22h, 22i and 22j in order from the object side. The fifth lens 22e and the sixth lens 22f are cemented to each other.

In order that the lens is telecentric on the emitter unit 10 side, the rear focal point of the first lens group 21-1 substantially coincides with the aperture stop S. In order that the lens is telecentric on the photosensitive medium P side, the front focal point of the second lens group 22-2 substantially coincides with the aperture stop S.

The lens defining numerical structure of the second example is shown in Table 5. In Table 5, r is the radius of the curvature (in mm, corresponding to surfaces rn in FIGS. 8 and 31 from r1 to r27), dn is the thickness of the lens or spatial distance between lenses (in mm, corresponding to dn notations in FIGS. 8 and 31 from d1 to d26), n-450 is the refractive index of the lens at 450 nm, and ν is the Abbe number of the glass.

For the second example of a reduction lens system 20-2 as applied to the first, third and fourth embodiments, the focal length f is 131.58 mm, the F number FNo is 1:2.5, the distance d0 along the optical axis from the aperture plate 13 to the object side surface of the first lens group 21 is 17.25 mm, the back focus fB is 19.66 mm, and the magnification M is −0.040. In the second example of a reduction lens system 20-2, the first lens 22a, the third lens 22c, the sixth lens 33f and the tenth lens 22j of the second lens group 22-2 are made from anomalous dispersion glass having the properties previously described in connection with the first example.

TABLE 5

| SURFACE | rn | dn | n-450 | ν |
|---|---|---|---|---|
| r1 | ∞ | 47.00 | 1.52485 | 64.1 |
| r2 | −370.000 | 360.48 | | |
| r3 | 198.800 | 18.00 | 1.49480 | 70.2 |
| r4 | −533.000 | 69.40 | | |
| r5 | −73.562 | 5.00 | 1.63114 | 49.8 |
| r6 | 81.685 | 19.92 | | |
| r7 | 135.029 | 9.80 | 1.49480 | 70.2 |
| r8 | −65.656 | 28.89 | | |
| r9 | 189.224 | 2.00 | 1.50347 | 81.6 |
| r10 | 19.820 | 6.50 | | |
| r11 | 45.983 | 3.50 | 1.71354 | 31.1 |
| r12 | −112.300 | 7.32 | | |
| r13 | 9.797 | 5.30 | 1.50347 | 81.6 |
| r14 | 71.564 | 0.28 | | |
| r15 | 24.903 | 1.20 | 1.66888 | 33.8 |
| r16 | 8.164 | 5.00 | | |
| Aperture S | | 4.00 | | |
| r17 | −5.650 | 1.20 | 1.66888 | 33.8 |
| r18 | −24.770 | 4.00 | 1.50347 | 81.6 |
| r19 | −8.925 | 0.25 | | |
| r20 | −18.870 | 4.00 | 1.49480 | 70.2 |
| r21 | −12.676 | 0.20 | | |
| r22 | 94.898 | 3.50 | 1.49480 | 70.2 |
| r23 | −105.792 | 0.10 | | |
| r24 | 38.083 | 3.50 | 1.49480 | 70.2 |
| r25 | −155.523 | 0.10 | | |
| r26 | 29.723 | 3.00 | 1.50347 | 81.6 |
| r27 | −211.054 | | | |

FIG. 33 is a chart showing spherical aberration of the second lens group 22-2 of the second example reduction lens system 20-2 applied in at least the first embodiment; and FIGS. 34A through 34D are charts showing transverse aberration of the second lens group 22-2 of the second example reduction lens system 20-2 applied in at least the first embodiment. As shown in FIGS. 11, 12A through 12D, 33 and 34A through 34D, as described with respect to the first embodiment, the aberrations are corrected independently in the respective lens groups 21-1 and 22-2. Therefore, the aberrations undergo only slight deterioration when the second lens group 22 of the first embodiment, using the second example of a reduction lens system 20-2 as described, is moved for focusing.

For the second example of a reduction lens system 20-2 as applied to the second embodiment, the focal length f is 131.58 mm, the F number FNo is 1:2.5, the distance d0 along the optical axis from the aperture plate 13 to the object side surface of the first lens group 21 is 100 mm, the back focus fB is 19.53 mm, and the magnification M is −0.039. All other dimensions are as given in Table 5.

When the second lens example is applied to the second embodiment, if the second lens group 22-2 is slightly moved, the telecentric condition is lost, and the image magnification varies. FIGS. 35A through 35C are charts showing, respectively, spherical aberration, astigmatism and distortion of the second example of a reduction lens system 20-2 as applied to the second embodiment in the normal condition. When the second lens group 22-2 moves to the photosensitive medium P side by 7 mm (i.e., d8 becomes 35.89 mm), the aberrations are changed as shown in FIGS. 36A through 36C. When the second lens group 22-2 moves to the emitter unit 10 side by 7 mm (i.e., d8 becomes 21.89), the aberrations are changed as shown in FIG. 37A through 37C. As shown in FIGS. 36A through 36C and 37A through 37C, even though the second lens group 22-2 of the second example of a reduction lens system 20-2 is moved to adjust the magnification, almost no deterioration in the aberration appears as a result of the movement.

Figure 38:
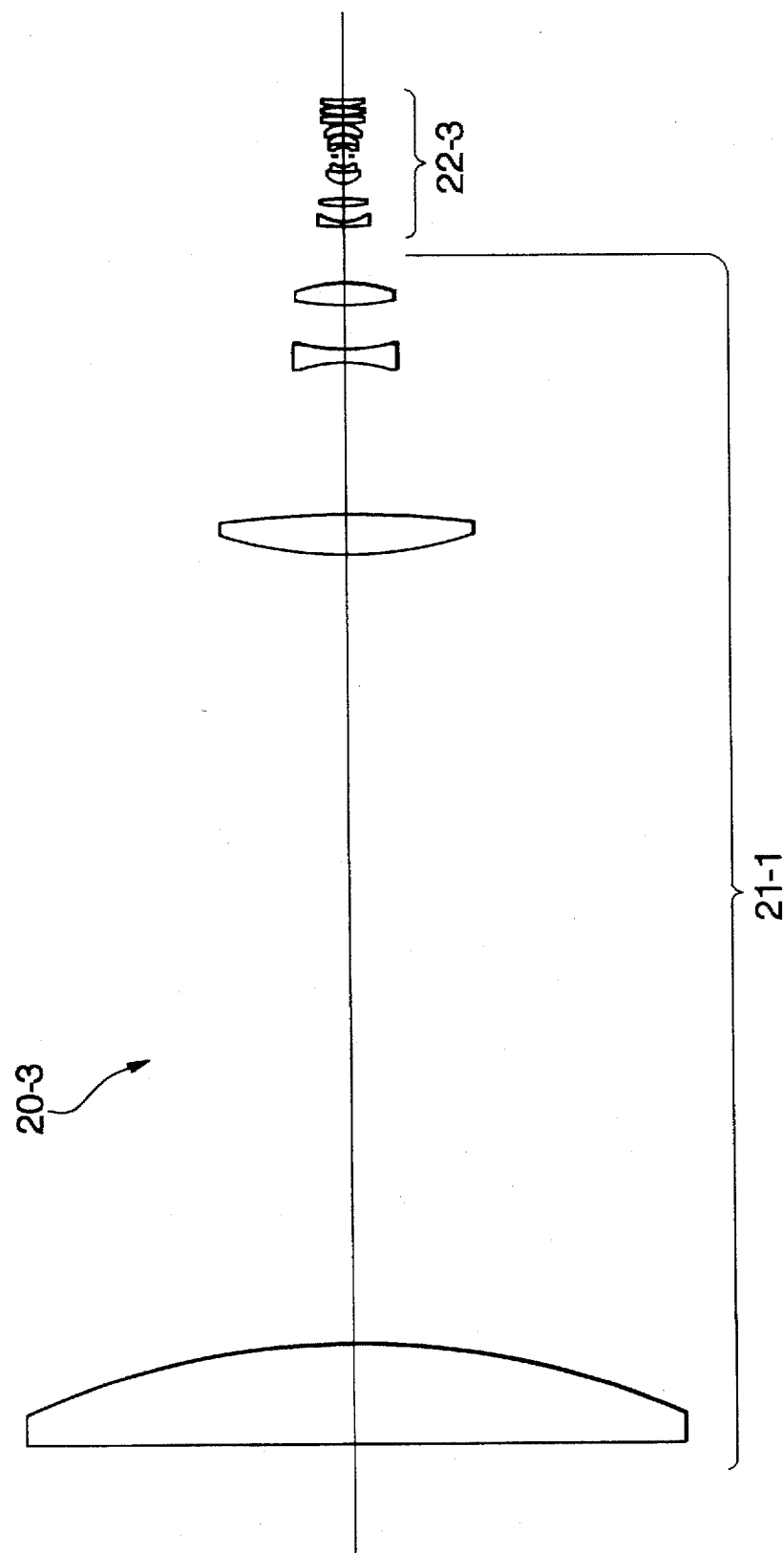
FIG. 38 is a lens configuration of a third example of a reduction lens system applicable to the embodiments.
Figure 39:
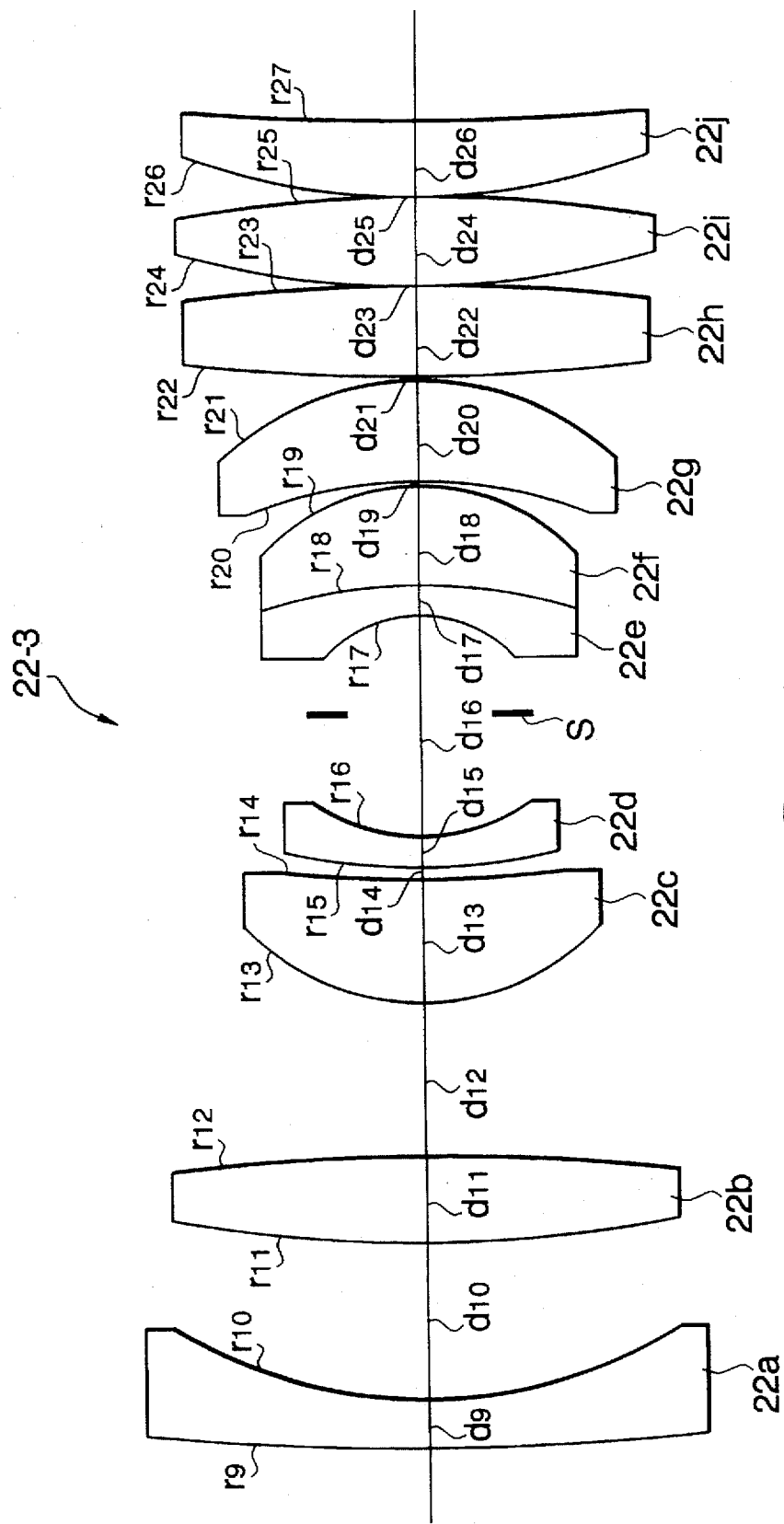
FIG. 39 is a lens configuration of a second lens group of the third example of a reduction lens system.

FIG. 38 is a lens configuration of a third example of a reduction lens system 20-3 applicable to the embodiments; and FIG. 39 is a lens configuration of a second lens group 22-3 of the third example of a reduction lens system 20-3. FIG. 38 shows the entire reduction lens system 20-3, and FIG. 39 shows the second lens group 22-3 in detail. The construction of the second lens group 21-1 is identical to that in the first example 20-1 and as previously described. FIGS. 40A through 40E show various aberrations of the third example of a reduction lens system 20-3. FIG. 40A is an aberration chart, in mm, of spherical aberration SA and sine condition SC at a wavelength of 450 nm. FIG. 40B shows chromatic aberration expressed as spherical aberrations, in mm, at 400 nm, 450 nm, and 550 nm wavelengths. FIG. 40c shows lateral chromatic aberration, in mm, at 400 nm and 550 nm wavelength. FIG. 40D shows astigmatism, in mm (S: sagittal, M: meridional). FIG. 40E shows the distortion (in percent).

The second lens group 22-3 is constructed as nine groups having ten pieces and is indicated from the ninth surface r9 to the last and twenty-seventh surface r27 in FIG. 34, and in Table 6 below. The second lens group 22-3 consists of a negative first lens 22a, a positive second lens 22b, a positive third lens 22c, a negative fourth lens 22d, an aperture stop S. a negative fifth lens 22e and positive sixth through tenth lenses 22f, 22g, 22h, 22i and 22j in order from the object side. The fifth lens 22e and the sixth lens 22f are cemented to each other.

In order that the lens is telecentric on the emitter unit 10 side, the rear focal point of the first lens group 21-1 substantially coincides with the aperture stop S, as previously described. In order that the lens is telecentric on the photosensitive medium P side, the front focal point of the second lens group 22-3 substantially coincides with the aperture stop S.

The lens defining numerical structure of the first example is shown in Table 6. In Table 6, r is the radius of the curvature (in mm, corresponding to surfaces rn in FIGS. 8 and 34 from r1 to r27), dn is the thickness of the lens or spatial distance between lenses (in mm, corresponding to dn notations in FIGS. 8 and 34 from d1 to d26), n-450 is the refractive index of the lens at 450 nm, and ν is the Abbe number of the glass.

For the third example as applied to the first, third and fourth embodiments, the focal length f is 133.04 mm, the F number FNo is 1:2.5, the distance d0 along the optical axis from the aperture plate 13 to the object side surface of the first lens group 21 is 17.25 mm, the back focus fB is 18.44 mm, and the magnification 1 is −0.040. The first lens 22a, the third lens 22c and the sixth lens 33f of the second lens group 22-3 are made from anomalous dispersion glass having the properties previously described in connection with the first example.

TABLE 6

| SURFACE | rn | dn | n-450 | v |
|---|---|---|---|---|
| r1 | ∞ | 47.00 | 1.52485 | 64.1 |
| r2 | −370.000 | 360.48 | | |
| r3 | 198.800 | 18.00 | 1.49480 | 70.2 |
| r4 | −533.000 | 69.40 | | |
| r5 | −73.562 | 5.00 | 1.63114 | 49.8 |
| r6 | 81.685 | 19.92 | | |
| r7 | 135.029 | 9.80 | 1.49480 | 70.2 |
| r8 | −65.656 | 29.90 | | |
| r9 | 153.719 | 2.00 | 1.50347 | 81.6 |
| r10 | 19.757 | 6.50 | | |
| r11 | 53.471 | 3.50 | 1.71354 | 31.1 |
| r12 | −81.213 | 6.13 | | |
| r13 | 9.775 | 5.30 | 1.50347 | 31.6 |
| r14 | 85.243 | 0.47 | | |
| r15 | 32.114 | 1.20 | 1.66888 | 33.8 |
| r16 | 8.707 | 5.00 | | |
| Aperture S | | 4.00 | | |
| r17 | −5.561 | 1.20 | 1.66888 | 33.8 |
| r18 | −31.156 | 4.00 | 1.50347 | 81.6 |
| r19 | −9.070 | 0.25 | | |
| r20 | −19.045 | 4.00 | 1.49480 | 70.2 |
| r21 | −12.344 | 0.20 | | |
| r22 | 71.003 | 3.50 | 1.49480 | 70.2 |
| r23 | −109.050 | 0.10 | | |
| r24 | 34.908 | 3.50 | 1.49480 | 70.2 |
| r25 | −60.862 | 0.10 | | |
| r26 | 28.050 | 3.00 | 1.49480 | 70.2 |
| r27 | 93.255 | | | |

FIG. 41 is a chart showing spherical aberration of the second lens group 22-3 of the third example reduction lens system 20-3 as applied in at least the first embodiment; and FIGS. 42A through 42D are charts showing transverse aberration of the second lens group 22-3 of the third example reduction lens system 20-3 applied in at least-the first embodiment. As shown in FIGS. 11, 12A through 12D, 41 and 42A through 42D, as described with respect to the first embodiment, the aberrations are corrected independently in the respective lens groups 21-1 and 22-3. Therefore, the aberrations undergo only slight deterioration when the second lens group 22 (in this case, the second lens group 22-3 of the third example of-a reduction lens system 20-3 as described) of the first embodiment is moved for focusing.

For the third example of a reduction lens system 20-3 as applied to the second embodiment, the focal length f is 133.04 mm, the F number FNo is 1:2.5, the distance d0 along the optical axis from the aperture plate 13 to the object side surface of the first lens group 21 is 100 mm, the back focus fB is 18.31 mm, and the magnification N is −0.039. All other dimensions are as given in Table 6.

When the third lens example is applied to the second embodiment, if the second lens group 22-3 is slightly moved, the telecentric condition is lost, and the image magnification varies. FIGS. 43A through 43C are charts showing, respectively, spherical aberration, astigmatism and distortion of the third example of a reduction lens system 20-3 as applied to the second embodiment in the normal condition. When the second lens group 22-3 moves to the photosensitive medium P side by 7 mm (i.e., d8 becomes 36.90 mm), the aberrations are changed as shown in FIGS. 44A through 44C. When the second lens group 22-3 moves to the emitter unit. 10 side by 7 mm (i.e., d8 becomes 22.90), the aberrations are changed as shown in FIGS. 45A through 45C. As shown in FIGS. 44A through 44C and 45A through 45C, even though the second lens group 22-3 of the third example of a reduction lens system 20-3 is moved to adjust the magnification, almost no,deterioration in the aberration appears as a result of the movement.

For each example of a reduction lens system in the second embodiment, Table 7 shows the standard magnification when the distance between the first and second lens groups is set to d8 in the appropriate Table, and the distance is adjusted within a range of ±7 mm. In each lens example, the magnification M can be changed by a maximum of 0.26%. Since the magnification error due to -the manufacturing error is considered to be about 0.1%, the variable range of ±7 mm is sufficient for compensation.

TABLE 7

| Example | Standard M | −7 mm adjust M (ratio) | +7 mm adjust M (ratio) |
|---|---|---|---|
| 1st example | −0.0391 | −0.0390 (−0.26%) | −0.392 (+0.26%) |
| 2nd example | −0.0390 | −0.0389 (−0.26%) | −0.391 (+0.26%) |
| 3rd example | −0.0390 | −0.0389 (−0.26%) | −0.391 (+0.26%) |

The present disclosure relates to subject matter contained in Japanese Patent Applications No. HEI 07-142744, filed on May 17, 1995, No. HEI 07-142745, filed on May 17, 1995, No. HEI 07-142747, filed on May 17, 1995, No. HEI 07-228531, filed on Aug. 14, 1995, and No. HEI 07-228532, filed on Aug. 14, 1995, which are expressly incorporated herein by reference in their entireties.

What is claimed is:

1. A multibeam recording device, comprising:
   an emitter unit having a plurality of light sources arranged in a two-dimensional pattern;
   a reduction lens system for focusing beams emitted by said emitter unit on a photosensitive surface, said reduction lens system including a positive first lens group, for forming collimated beams from light emitted by said emitter unit, and a second lens group, for relaying said collimated beams formed by said first lens group;
   a system that drives said second lens group in the optical axis direction; and
   a system that controls said driving system to maintain an in-focus condition of said reduction lens system with respect to said photosensitive surface.

2. The multibeam recording device according to claim 1, wherein said emitter unit further comprises:
   a plurality of apertures, each aperture corresponding to one of said plurality of light sources.

3. The multibeam recording device according to claim 1, wherein spherical aberration and coma are compensated within said first lens group and spherical aberration and coma are compensated within said second lens group.

4. The multibeam recording device according to claim 1, further comprising:
   a focus condition detection system that detects said infocus condition of said reduction lens system with respect to said photosensitive surface.

5. The multibeam recording device according to claim 1, wherein said light sources emit light having a wavelength range within the range of blue light.

6. The multi-beam recording device according to claim 1, further comprising a movable table, said photosensitive surface supported by said movable table, said movable table being movable in a direction transverse to the optical direction of said reduction lens system.

7. A multibeam recording device, comprising:
- an emitter unit having a two-dimensionally arranged plurality of light sources;
- a reduction lens system for projecting and focusing rays emitted by said emitter unit onto a photosensitive surface, said reduction lens system including, in order from said emitter unit, a positive first lens group and a positive second lens group;
- an adjusting system that varies a magnification of said reduction lens system by varying a distance between said first lens group and said second lens group,
- wherein said reduction lens system is telecentric with respect to said emitter unit and said photosensitive surface.

8. The multibeam recording device according to claim 7, wherein said emitter unit further comprises:
- a plurality of apertures, each aperture corresponding to one of said plurality of light sources.

9. The multibeam recording device according to claim 7, wherein a rear focal point of said first lens group is located outside of said first lens group, and a front focal point of said second lens group is located inside said second lens group.

10. The multibeam recording device according to claim 7, wherein said light sources emit light having a wavelength range within the range of blue light.

11. The multi-beam recording system according to claim 7, further comprising a movable table, said photosensitive surface being supported on said movable table, said movable table being movable in a direction transverse to an optical axis of said reduction lens system.

12. A multibeam recording device, comprising:
- an emitter unit having a two-dimensionally arranged plurality of light sources, said emitter unit comprising a plurality of apertures, each aperture corresponding to one of said plurality of light sources;
- a reduction lens system for projecting and focusing beams emitted by said emitter unit onto an image plane, said reduction lens system including a plurality of lens elements, and a lens moving system that moves at least one of said plurality of lens elements along an optical axis of said reduction lens system to adjust a magnification of said reduction lens system.

13. The multibeam recording device according to claim 12, wherein said reduction lens system is an afocal optical system.

14. The multibeam recording device according to claim 12, wherein said reduction lens system includes a first lens group and a second lens group, said first lens group being closer to said emitter unit than said second lens group and said first lens group forming a substantially collimated flux of light.

15. The multibeam recording device according to claim 13, wherein said lens moving means moves at least one lens element in said first lens group.

16. The multibeam recording device according to claim 13, further comprising:
- a second lens moving system that moves said second lens group of said reduction lens system in the optical axis direction to adjust focus of said reduction lens system.

17. The multibeam recording device according to claim 14,
wherein said first lens group includes: a condenser lens arranged closest to the emitter unit for relaying beams; and an image side lens group for forming a substantially collimated flux of light, and
wherein said lens moving system includes: a system that changes a distance between said condenser lens and said image side lens group in the direction of the optical axis to adjust magnification of said reduction lens system.

18. The multibeam recording device according to claim 17,
wherein said condenser lens is movable in the direction of the optical axis to adjust magnification of said reduction lens system.

19. The multibeam recording device according to claim 17,
wherein said image side lens group is movable in the direction of the optical axis to adjust magnification of said reduction lens system.

20. The multibeam recording device according to claim 17,
wherein said condenser lens is held in a first lens frame, said sage side lens group is held in a second lens frame, and said second lens group is held in a third lens frame, and
wherein said first lens frame, said second lens frame, and said third lens frame are separately supported.

21. The multi-beam recording device according to claim 12, further comprising a movable table upon which said image plane is supported, said table being movable in a direction transverse to the optical axis of said reduction lens system.

22. A multi-beam recording device, comprising:
- an emitter unit having a two dimensionally arranged plurality of light sources;
- a reduction lens system for projecting and focusing beams emitted by said emitter unit onto an image plane, said reduction lens system including a plurality of lens elements in order from the emitter unit side:
- a first lens group including a condenser lens,
- a second lens group, and
- wherein said condenser lens is held in a first lens frame, remaining elements of said first lens group excluding said condenser lens are held in a second lens frame, and said second lens group is held in a third lens frame, and
- wherein each of said first lens frame said second lens frame, and said third lens frame are separately supported,
- a decentering compensation system that adjusts at least two of said plurality of lens elements to compensate for decentering distortion of said reduction lens system,
- at least two of said first lens frame, said second lens frame, and said third lens frame are adjustable by said decentering compensation system to compensate for decentering distortion in said reduction lens system.

23. The multibeam recording device according to claim 22,
wherein aberrations are compensated within said first lens group and aberrations are compensated within said second lens group.

24. The multi-beam recording device according to claim 22, further comprising:
- a lens moving system that moves said third lens frame in the direction of the optical axis of the reduction lens system to focus said reduction lens system, and wherein said decentering compensation system comprises:
- a system that independently adjusts said first lens frame for decentering;
- a system that independently adjusts said second lens frame for decentering, and
- wherein said decentering includes shifting movement and tilting movement.

25. The multibeam recording device according to claim 22,
wherein said decentering compensation system comprises a system that moves at least one of said lens frames parallel to a plane normal to the optical axis of said reduction lens system.

26. The multibeam recording device according to claim 22,
wherein said decentering compensation system comprises a system that at least one of said lens frames so that the optical axes of the lenses held therein tilt with respect to the optical axis of the reduction lens system.

27. The multi-beam recording device according to claim 22, further comprising a movable table upon which the image plane is positioned, said table being movable in a direction transverse to an optical axis of said reduction lens system.

28. A reduction lens system, comprising in order from an object side of said lens;
- a positive first lens system group; and
- a positive second lens group, said positive second lens group containing an aperture stop and at least one positive lens element formed from anomalous dispersion glass, said at least one positive lens element being on an image side of said aperture stop,
- wherein said anomalous dispersion glass satisfies a first condition:

$$\nu > 70,$$

$\nu$ being an Abbe number of said anomalous dispersion glass, and
wherein said anomalous dispersion glass further satisfies a second condition;

$$\theta ig - \theta' ig > 0.10,$$

$\theta ig$ being a partial dispersion ratio calculated according to a first formula:

$$\theta ig = (ni - ng)/(nF - nC),$$

ni, ng, nF, and nC being indices of refraction for spectral lines i, g, F, and C, respectively, and
$\theta' ig$ being a predetermined point on a line connecting K7 optical glass and F2 optical glass on a correlation chart of $\theta ig$ versus $\nu$, and $\theta' ig$ being calculated according to a second formula:

$$\theta' ig = -8.374 \times 10^{-3} \times \nu + 1.725.$$

29. The reduction lens system according to claim 28, wherein said at least one positive lens element formed from said anomalous dispersion glass is a closest positive lens element to the aperture stop on said image side of the aperture stop.

30. The reduction lens system according to claim 29, wherein said second lens group is formed of a plurality of lens elements, and all positive lens elements on said image side of said aperture stop are formed from said anomalous dispersion glass.

31. The reduction lens system according to claim 28, wherein said at least one positive lens element formed from said anomalous dispersion glass is a farthest positive lens element from said aperture stop on the image side of the aperture stop.

32. The multibeam recording device according to claim 28,
wherein said second lens group comprises at least two positive lens elements formed from said anomalous dispersion glass on the image side of said aperture stop, one of said at least two positive lens elements being formed from said anomalous dispersion glass being the closest positive lens to the aperture stop on the image side of the aperture stop, and a remaining one of said at least two positive lens elements being formed from said anomalous dispersion glass being the farthest positive lens element from the aperture stop on the image side of the aperture stop.

33. The reduction lens system according to claim 28, said second lens group further comprising at least one negative lens element formed from said anomalous dispersion glass on said object side of said aperture stop.

34. The reduction lens system according to claim 33, wherein said at least one negative lens element formed from said anomalous dispersion glass is the farthest negative lens element from said aperture stop on said object side of said aperture stop.

35. The multibeam recording device according to claim 28,
wherein a closest positive lens element of said second lens group to said aperture stop on said object side of said aperture stop is formed from said anomalous dispersion glass.

36. A multibeam recording device, comprising:
an emitter unit including a plurality of two-dimensionally arranged blue light sources; and
a reduction lens system, comprising, in order from an object side of said lens: a positive first lens group and a positive second lens group, said positive second lens group containing an aperture stop and at least one positive lens element formed from anomalous dispersion glass, said at least one positive lens element being on an image side of said aperture stop, and said anomalous dispersion glass satisfying a first condition:

$$\nu > 70,$$

$\nu$ being an Abbe number of said anomalous dispersion glass, and said anomalous dispersion glass further satisfying a second condition:

$$\theta ig - \theta' ig > 0.10,$$

$\theta ig$ being a partial dispersion ratio calculated according to a first formula:

$$\theta ig = (ni - ng)/(nF - nC),$$

wherein ni, ng, aF, and nC are indices of refraction for spectral lines i, g, F, and C, respectively, and $\theta'$ig being a predetermined point on a line connecting K7 optical glass and F2 optical glass on a correlation chart of $\theta$ig versus $\nu$, and $\theta'$ig being calculated according to a second formula:

$$\theta'ig = -8.374 \times 10^{-3} \times \nu + 1.725,$$

wherein beams emitted by said emitter unit are focused on a predetermined image forming plane through said reduction lens system.

37. The multi-beam recording device according to claim 36, further comprising a movable table upon which the image forming plane is supported, said table being movable in a direction transverse to an optical axis of said reduction lens system.

* * * * *